(12) United States Patent
Doyle et al.

(10) Patent No.: US 12,333,028 B2
(45) Date of Patent: Jun. 17, 2025

(54) ACCESS DECISION MANAGEMENT SYSTEM FOR DIGITAL RESOURCES

(71) Applicant: Microsoft Technology Licensing, LLC, Redmond, WA (US)

(72) Inventors: Darren Doyle, Wicklow (IE); Terry Farrell, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 17/971,200

(22) Filed: Oct. 21, 2022

(65) Prior Publication Data

US 2024/0135009 A1 Apr. 25, 2024
US 2024/0232392 A9 Jul. 11, 2024

(51) Int. Cl.
*G06F 21/60* (2013.01)

(52) U.S. Cl.
CPC .................. *G06F 21/604* (2013.01)

(58) Field of Classification Search
CPC ...................................... G06F 21/604
See application file for complete search history.

(56) References Cited

U.S. PATENT DOCUMENTS

| | | | | |
|---|---|---|---|---|
| 9,160,742 | B1* | 10/2015 | Ackerman | H04L 63/0876 |
| 10,572,877 | B2* | 2/2020 | Aquino | G06Q 20/4016 |
| 10,686,600 | B1* | 6/2020 | Vo | G06F 21/33 |
| 10,929,756 | B1* | 2/2021 | Sadaghiani | G06F 9/3001 |
| 11,354,613 | B2* | 6/2022 | Mondal | G06Q 10/0635 |
| 2012/0226613 | A1* | 9/2012 | Adjaoute | G06Q 40/02 705/44 |
| 2015/0343791 | A1* | 12/2015 | Takagi | B41J 2/1752 347/87 |
| 2020/0145425 | A1* | 5/2020 | Chauhan | H04L 63/107 |
| 2020/0302074 | A1 | 9/2020 | Little | |

(Continued)

OTHER PUBLICATIONS

International Search Report and Written Opinion received for PCT Application No. PCT/US2023/031936, Dec. 6, 2023, 11 pages.

(Continued)

*Primary Examiner* — Simon P Kanaan
(74) *Attorney, Agent, or Firm* — Novo TechIP International PLLC

(57) ABSTRACT

A data processing system implements receiving an access request from the client device of a content requestor to access a content item for which access to the content item is managed by a content access management platform and obtaining access control information. The access control information comprising information associated with a content owner associated with the content item, information associated with the content requestor, and information associated with the content item. The system further implements analyzing the access control information using a first machine learning model trained to analyze the access control information and to output an access determination score, the access determination score representing a level of certainty that the content requestor should be granted access to the content item, determining an automatic access decision to grant or deny the access request based on the access determination score, and notifying the content requestor whether the access request has granted or denied based on the automatic access decision.

19 Claims, 24 Drawing Sheets

(56) References Cited

U.S. PATENT DOCUMENTS

| | | |
|---|---|---|
| 2020/0334095 A1* | 10/2020 | Xu .................... H04L 63/1425 |
| 2020/0412726 A1 | 12/2020 | Nevatia |
| 2021/0295427 A1* | 9/2021 | Shiu ........................ G06N 5/04 |
| 2021/0409419 A1 | 12/2021 | Kraus |

OTHER PUBLICATIONS

International Preliminary Report on Patentability received for PCT Application No. PCT/US2023/031936, May 1, 2025, 9 pages.

* cited by examiner

To: Jane Nakamura <jnakamura@contoso.com>
From: filemanager@contoso.com
Subject: File Access Request: Project X Document from Scott Smith Dear Jane:

User Scott Smith (smith@contoso.com) has requested access to the file Document C in the Project X Documentation for which you are listed as an owner of the file.

Please click on Grant Access below if you would like to grant Scott access to the requested file or click Deny Access below if you do not wish to grant Scott access to the requested file. Always check to be sure that you know the person requesting access to files or other content before granting access.

| Grant Access | Deny Access |

To: Jane Nakamura <jnakamura@contoso.com>
From: filemanager@contoso.com
Subject: File Access Request: Project X Document from Scott Smith Dear Jane:

User Scott Smith (smith@contoso.com) has requested access to the file Document C in the Project X Documentation for which you are listed as an owner of the file.

Scott has provided the following reason for requesting access:

> I recently joined the marketing team and have been asked to come up to speed on Project X so that we can being preparing the materials for the upcoming Developer's Conference.

Please click Grant Access below if you would like to grant Scott access to the requested file or click Deny Access below if you do not wish to grant Scott access to the requested file. Always check to be sure that you know the person requesting access to files or other content before granting access.

[ Grant Access ]    [ Deny Access ]

Access Configuration

Please select the level of access that you would like to grant to Scott Smith to "Document C" stored in the "Project X Documentation" folder:

■ Read-Only Access

☐ Full Access – No Time Limit

☐ Limited Access – No Time Limit – provides read-only access without a time restriction ☐ Limited Access – Time Limited Access – provides read-only access for [ 24 Hours ]

[ Submit ]   [ Cancel ]

FIG. 5C

To: Jane Nakamura <jnakamura@contoso.com>
From: filemanager@contoso.com
Subject: File Access Request: Project X Document from Scott Smith Dear Jane:

User Scott Smith (smith@contoso.com) requested access to the file Document C in the Project X Documentation for which you are listed as an owner of the file.

You were unavailable at the time and the Content Access Management Platform automatically granted access to Scott based on: (1) you and Scott have collaborated on other content recently, and (2) you and Scott are members of the same department.

Scott has been granted Full Access to Document C.

Please click Confirm Access below if you agree with the access granted to Scott. Click the Configure Access button to change the access level granted to Scott, or click the Deny Access button if you do not believe that Scott should have been granted access to Document C. Always check to be sure that you know the person requesting access to files or other content before granting access.

| Confirm Access | Configure Access | Revoke Access |

FIG. 5D

Revoke Access

Please select one or more reasons that Scott Smith should not have been granted access to Document C stored in the Project X Documentation folder:

■ I don't know Scott.

☐ Scott should not have access to the file.

☐ The document content is sensitive and access should only be granted by me.

☐ The document content is sensitive and access should only be granted by the following users:

Close  Submit

FIG. 5E

To: Jane Nakamura <jnakamura@contoso.com>
From: filemanager@contoso.com
Subject: File Access Revoked: Access to Project X Document by Scott Smith Revoked Dear Jane:

Access to Document C by user Scott Smith (smith@contoso.com) has been revoked. You are listed as an owner of this file.

Scott requested access to Document C in the Project X Documentation, and the Content Access Management Platform automatically granted Full Access to Scott based on: (1) you and Scott have collaborated on other content recently, and (2) you and Scott are members of the same department.

Please click Confirm Revocation if you agree that the access should have been revoked. If you believe that the access should not have been revoked, please click Configure Access below to configure access for Scott. If you require additional information, please click More Information below for information why access was revoked.

Always check to be sure that you know the person requesting access to files or other content before granting access.

| More Information | Configure Access | Confirm Revocation |

To: Jane Nakamura <jnakamura@contoso.com>
From: filemanager@contoso.com
Subject: File Access Revoked: Access to Project X Document by Scott Smith Revoked Dear Jane:

Access to Document C by user Scott Smith (smith@contoso.com) has been revoked. You are listed as an owner of this file, and you granted Scott Full Access to Document C.

Please click Confirm Revocation if you agree that the access should have been revoked. If you believe that the access should not have been revoked, please click Configure Access below to configure access for Scott. If you require additional information, please click More Information below for information why access was revoked.

Always check to be sure that you know the person requesting access to files or other content before granting access.

| More Information | Configure Access | Confirm Revocation |

FIG. 5G

ACCESS DECISION MANAGEMENT SYSTEM FOR DIGITAL RESOURCES

BACKGROUND

Zero Trust is a cybersecurity architecture in which all users are required to be authenticated and authorized before being granted access to enterprise content. The enterprise content may include various types of digital resources, such as but not limited to documents, applications, data sources, program code, and/or other such enterprise content. Users both within and outside of the enterprise network are subjected to stringent authentication and authorization requirements. Furthermore, all requests to access content are vetted prior to allowing access to the content. While the Zero Trust architecture provides robust security protections for enterprise content, the implementation of such an architecture can present technical and logistical challenges in an enterprise. Content owners may be required to manually approve access to certain enterprise content, which can create a bottleneck for users requiring access to the content. The work schedules of the content owners and the users requesting access to the content may not align, particularly in large enterprises that span multiple time zones. Furthermore, even where the work schedules of the content owners and the content requestors align, the content owners may be occupied by other tasks or otherwise unavailable to attend to requests to grant access to the content. Consequently, the users requesting the content may experience significant delays to obtain access to content that they need to complete work tasks that rely on this content. Hence, there is a need for improved systems and methods that provide a technical solution for making access decisions for enterprise content.

SUMMARY

An example data processing system according to the disclosure may include a processor and a machine-readable medium storing executable instructions. The instructions when executed cause the processor to perform operations including receiving an access request from the client device of a content requestor to access a content item for which access to the content item is managed by a content access management platform; obtaining access control information, the access control information comprising information associated with a content owner associated with the content item, information associated with the content requestor, and information associated with the content item; analyzing the access control information using a first machine learning model trained to analyze the access control information and to output an access determination score, the access determination score representing a level of certainty that the content requestor should be granted access to the content item; determining an automatic access decision to grant or deny the access request based on the access determination score; and notifying the content requestor whether the access request has granted or denied based on the automatic access decision.

An example data processing system according to the disclosure may include a processor and a machine-readable medium storing executable instructions. The instructions when executed cause the processor to perform operations including receiving an access request from the client device of a content requestor to access a content item for which access to the content item is managed by a content access management platform; obtaining information indicative of a relationship between the content owner and the content requestor; analyzing the relationship information using a first machine learning model trained to analyze the relationship information and to output an access determination score, the access determination score representing a level of certainty that the content requestor should be granted access to the content item; determining an automatic access decision to grant or deny the access request based on the access determination score; and notifying the content requestor whether the access request has granted or denied based on the automatic access decision.

An example method implemented in a data processing system for automated access control decisions includes receiving an access request from the client device of a content requestor to access a content item for which access to the content item is managed by a content access management platform; obtaining access control information, the access control information comprising information associated with a content owner associated with the content item, information associated with the content requestor, and information associated with the content item; analyzing the access control information using a first machine learning model trained to analyze the access control information and to output an access determination score, the access determination score representing a level of certainty that the content requestor should be granted access to the content item; determining an automatic access decision to grant or deny the access request based on the access determination score; and notifying the content requestor whether the access request has granted or denied based on the automatic access decision.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A-5G are diagrams of an example user interface for managing access to content managed by the content services platform shown in the preceding figures.

DETAILED DESCRIPTION

Techniques for access decision management for digital resources are provided. These techniques address the technical problems associated with managing access requests for content items in a content access management platform which has strict security architectures. Strict access control policies can lead to significant interruptions in the workflow within an enterprise when users who require access to protected content do not have access to the content needed to complete their work tasks. Currently, users unable to access such content must attempt to contact the content owner to grant permission to the required content. However, this is not a practical solution in large enterprises. Users are often located across multiple time zones and may not have overlapping work schedules. Furthermore, the content owners may be busy with other tasks and unable to immediately respond to such requests to grant access to content items.

The techniques herein provide a technical solution to the problem of managing such access decisions by balancing the needs of enterprise users to access content and the needs of the content owners to control who may access the content without compromising the security of the content. These techniques collect and analyze metadata and network information indicative of the relationships between the content owners and the users requesting access to content as well as the relationships between the users requesting access to the content and the content being requested. This information may be collected from numerous data sources and analyzed by one or more machine learning models trained to make access decisions based on the information collected. A technical benefit of this approach is that access decisions on whether to permit a user to access requested content can often be automated without compromising the security of the content. The machine learning model or models assess whether the users requesting access to content items should be granted access to the requested content. The system includes means for object owners and/or other users to provide feedback regarding the automated access decisions to improve the access decisions made by the models. This approach provides an improved user experience by automating many access decisions to avoid interrupting the user workflow while enforcing security and privacy considerations associated with requested content items. The techniques herein can be applied in various types of security architectures, including but not limited to zero trust architectures in which users both within and outside of an enterprise network are subjected to stringent authentication and authorization requirements to access digital content protected by the security architecture. These and other technical benefits of the techniques disclosed herein will be evident from the discussion of the example implementations that follow.

Figure 1:
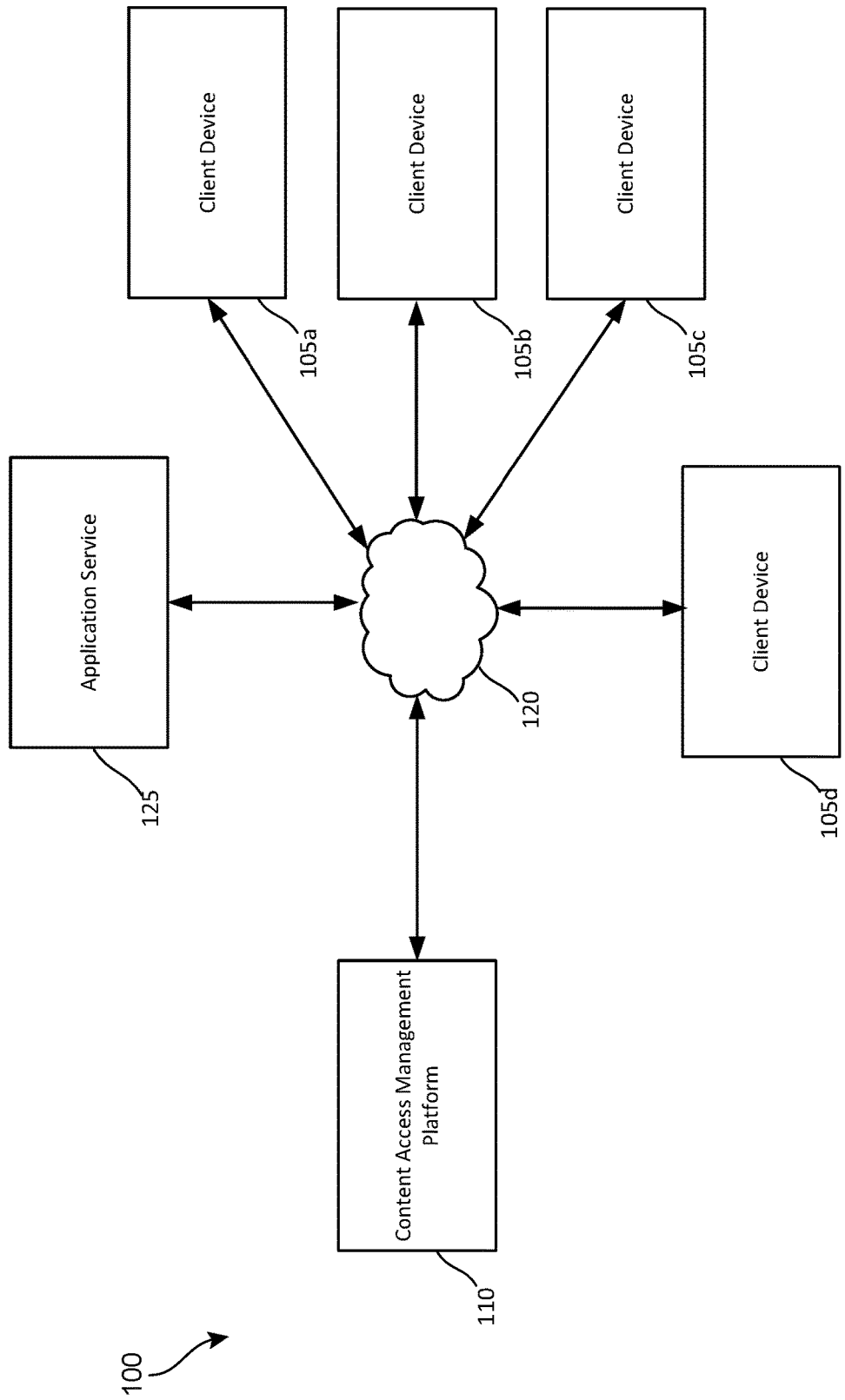
FIG. 1 is a diagram showing an example computing environment in which the techniques disclosed herein for access decision management may be implemented.

FIG. 1 is a diagram showing an example computing environment 100 in which the techniques disclosed herein for access decision management may be implemented. The computing environment 100 may include a content access management platform 110. The example computing environment 100 may also include client devices 105a, 105b, 105c, and 105d (collectively referred to as client device 105) and application services 125. The client devices 105a, 105b, 105c, and 105d may communicate with the content access management platform 110 and/or the application service 125 via the network 120. Furthermore, the application service 125 may communicate with the content access management platform 110 via the network 120. The network 120 may be a combination of one or more public and/or private networks and may be implemented at least in part by the Internet.

In the example shown in FIG. 1, the content access management platform 110 is implemented as a cloud-based service or set of services. The content access management platform 110 is configured to store and manage access to the enterprise content to the client devices 105a-105d. The enterprise content may include various types of digital resources, such as but not limited to documents, files, applications, data sources, program code, and/or other such digital content. The content access management platform 110 is configured to make automated access decisions in response to user requests to access content items.

In some implementations, the content access management platform 110 is configured to receive an access request from a content requestor to access specific content and to forward the request to the content owner to process the request. The content requestor is a user who does not have access to the requested content item, and the content owner is a user who created the content item and/or manages who may access the content item. In some implementations, the content owner may specify in access control parameters associated with the content item that the content owner must manually approve or deny all access requests for that content item. In such implementations, the content access management platform 110 sends an access request to the content owner that identifies the content requestor and the content item for which access is being sought. The content owner may then respond to the access request by granting the content requestor access to the content item or denying the content requestor access to the content item. As will be discussed in greater detail in the examples which follow, the content owner can configure the level of access and the length of time for which access is granted. Furthermore, the content owner can provide reasons why the access request has been denied.

The content access management platform 110 is configured to automate the access decisions in some instances. In some implementations, the content access management platform 110 is configured to automatically make access decisions for content when the content owner is unavailable. The term "unavailable" user herein refers to the content owner being offline and/or busy attending to other tasks, and thus, unlikely to be able to respond to an access request in a timely manner. The content access management platform 110 collects data from various information sources, such as but not limited to calendar information, work schedule information, meeting invitations, and/or other types of information that may be used to predict whether the content owner is likely to respond to the access request within a predetermined amount of time. The content access management platform 110 may also consider how long it typically takes the content owner to respond to access requests when determining whether to make an automated access decision. In some implementations, the content access management platform 110 may grant the content requestor temporary and/or limited access to the requested content and send an access request to the content owner to confirm whether access should have been granted. The content owner may confirm that the access grant was properly determined by the content access management platform 110 or revoke the access granted to the content requestor. The user may also configure the level of access that was granted to the user. The control management platform 110 makes these grant decisions using one or more machine learning models trained to predict whether the access should be granted to the requesting user. The feedback provided by the content owners is used to improve the access grant predictions made by the one or more models. The one or more models are trained to analyze various types of information to make the automated access control decisions, including but not limited to information indicative of the relationship between the content owner and the content requestor, information indicative of the relationship between the content requestor and the content for which access is being requested, access control settings associated with the requested content, and/or historical information indicative of the types of users. Additional details of the functionality provided by the content access management platform 110 is provided in the examples which follow.

In some implementations, the content access management platform 110, or at least a portion of the functionality thereof, may be implemented by the application services 125 to provide content storage and/or management of access to the content for users of the application services. In other implementations, the content access management platform 110, or at least a portion of the functionality thereof, may be implemented by a native application on the client devices 105a, 105b, 105c, and 105d.

The application service 125 provides cloud-based software and services that are accessible to users via the client devices 105a, 105b, 105c, and 105d. The application service 125 provides one or more software applications, including but not limited to communications platform and/or collaboration platform, a word processing application, a presentation design application, and/or other types of applications in which user may create and/or access electronic content. The electronic content may be stored on the content access management platform 110 and/or the client devices 105a-105d. The term "electronic content" as used herein can be representative of any document or component in electronic form that can be created by a computing device, stored in a machine-readable medium, and/or transferred among computing devices over a network connection or via a machine-readable medium. Examples of such electronic documents include but are not limited to word processing documents, program code, presentations, websites (e.g., Microsoft SharePoint® sites), digital drawings, media files, components thereof, and the like.

The client devices 105a, 105b, 105c, and 105d are each a computing device that may be implemented as a portable electronic device, such as a mobile phone, a tablet computer, a laptop computer, a portable digital assistant device, a portable game console, and/or other such devices. The client devices 105a, 105b, and 105c may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices 105 that utilize the application service 125 and/or the content access management platform 110. Furthermore, in some implementations, the application functionality provided by the application service 125 is implemented by a native application installed on the client devices 105a, 105b, 105c, and 105d, and the client devices 105a, 105b, 105c, and 105d communicate directly with the content access management platform 110 over a network connection.

In the example implementation shown in FIG. 1, each of the client devices 105a, 105b, 105c, and 105d is associated with the same user to more clearly illustrate the techniques herein. In this example implementation, the client device 105a is a laptop computer, the client device 105b is a desktop computer, the client device 105c is a mobile phone, and the client device 105d is a tablet computer 105d. However, the user may be associated with a different number and/or different type or types of client devices in other implementations. In a typical implementation, the content access management platform 110 provides file storage and management services to many users who are associated with one or more client devices 105. Furthermore, in some implementations, the content access management platform 110 facilitates synchronization of files among the devices of more than one user. For example, users within an organization or enterprise, within a family, or other groups of users may permit certain files and/or folders to be shared with other specified users and to be synchronized with one or more client devices 105 of the other users.

Figure 2:
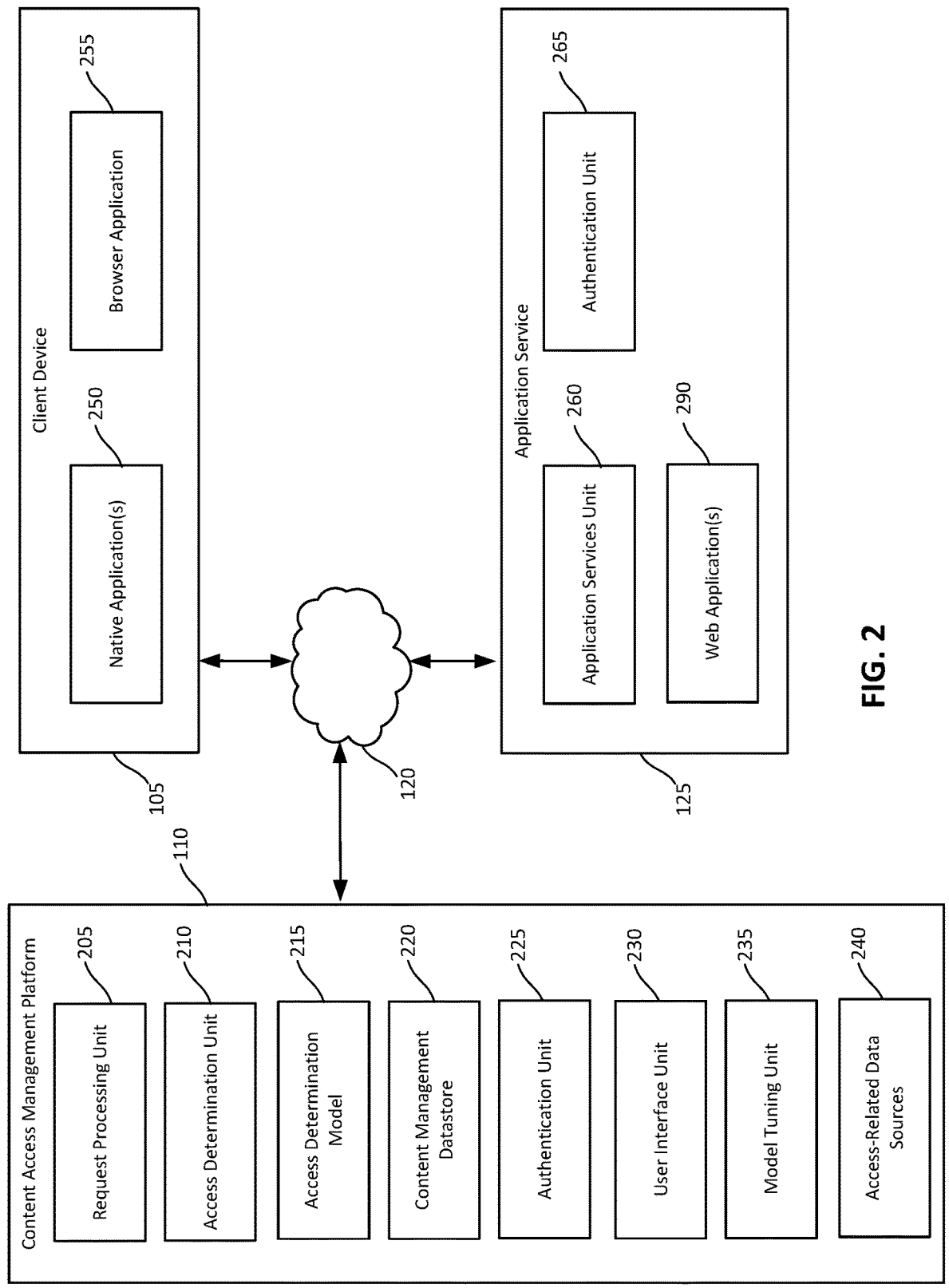
FIG. 2 is a diagram showing additional features of the content access management platform, the client device, and the application service shown in FIG. 1.

FIG. 2 is a diagram showing additional features of the content access management platform 110, the client device 105, and the application service 125. The content access management platform 110 includes a request processing unit 205, an access determination unit 210, an access determination model 215, a content management datastore 220, an authentication unit 225, a user interface unit 230, a model tuning unit 235, and access-related data sources 240.

The request processing unit 205 receives incoming requests to access content managed by the content access management platform 110 from the client device 105 and/or the application service 125. The incoming requests may be to access a content item that the content requestor already has permission to access or may be for a content item for which the content requestor does not have permission to access. The requests include information identifying the content item or items being requested and identifying the content requestor. The request processing unit 205 provides the incoming request to the access determination unit 210 which determines whether the user is authorized to access the requested content.

The access determination unit 210 accesses content information from the content management datastore 220 which stores access control information associated with the files managed by the content access management platform 110. The access control information identifies the content owner of each content item as well as any access control policies associated with the content items. The access control policies indicate which users may access the content items. In some implementations, the access control policies enumerate specific users who are granted access to a specific content item and the level of access that these users are provided. In a non-limiting example, a first user is granted full access to a content item, which permits the first user to access and/or modify the content item, while a second user is granted limited access to the content item, which provides read-only access to the second user. In some implementations, the access control policies may indicate that certain groups of users are permitted to access a content item. Such groups may include but are not limited to certain teams, groups, or departments within an enterprise. The access control policies may also impose limits on how the content item may be utilized. Such limits may include but are not limited to preventing the content item from being printed, emailed to an email address outside of the enterprise, prevent copying and pasting of content from the content item to another content item, and/or other such restrictions on the usage of the content item.

The access determination unit 210 is configured to process access control requests from content requestors. The access determination unit 210 determines whether access requests from content requestors require manual approval by the content owners. The access determination unit 210 accesses the access control information from the content management datastore 220 for content item for which access has been requested. If the access control information indicates that manual approval by the content owner is required, the access determination unit generates and sends an access request message to the content owner. The access request message identifies the content item being requested, the content requestors, and/or other relevant information that the content owner may use to assess whether to grant or deny access to the content item. The other relevant information may include but is not limited to a date and time that the access request was received by the content access management platform 110, information provided by the content requestor indicating why access to the content item is being requested, and/or such information. The access request message may be sent to the content owner via email or via other types of messaging. In some implementations, the access request message is provided via a user interface provided by the user interface unit 230 of the content access management platform 110. Examples of this user interface are provided in the examples which follow.

The access determination unit 210 makes an automated access determination in instances where the access control policies do not require that the content owner manually grant or deny access to the content item and the content owner is currently unavailable. The access determination unit 210 analyzes data from numerous access-related data sources 240 to determine an access determination score for a particular access request for access to a content item from a particular content requestor. The access determination unit 210 considers numerous factors that are indicative of the relationships between the content owners and the content requestors as well as relationships between the content requestor and the content item being requested. Additional details of the metadata that may be collected and analyzed is described with respect to the access-related data sources 240.

In some implementations, the access determination unit 210 utilizes the access determination model 215 to analyze the metadata to calculate the access determination score for a particular access request. The access determination model 215 is a machine learning model that has been trained to analyze various information regarding the content requestor, the content owner, and the content item being requested to determine an access determination score that represents a level of certainty that the content requestor should be granted access to the content item. The access determination model 215 may be initially trained offline using a set of labeled training data that trains the model to assess the various factors discussed above when determining whether to automatically grant or deny an access request from a content requestor. The access determination model 215 may be implemented using various types of machine learning and/or deep learning models in various implementations. In some implementations, the access determination unit 210 is configured to grant an access request if the access determination score exceeds a predetermined threshold. Otherwise, the access request is automatically denied or is sent to the content owner for manual approval or denial. In other implementations, the access determination unit 210 is configured to automatically grant different levels of access to the content requestor based on the content score. Each level of access is associated with a range of scores, and the content requestor is granted the level of access based on the range of scores into which the access determination score fell. Additional details of how the access determination unit 210 processes access requests are provided in the examples which follow.

The user interface unit 230 provides a web application that can be accessed by a browser application or browser-enabled native application of the client devices 105a-105d. The web application provides a user interface for accessing content items managed by and/or stored on the content access management platform 110. Examples of user interfaces that may be provided by the user interface unit 230 are shown in FIGS. 4A-4I and 5A-5G.

The content management datastore 220 is a persistent datastore that is used by the content access management platform 110 to store files and/or folders synchronized from the client devices 105a-105d, metadata associated with the files and/or folders, data collected from various data sources for determining the relationships among content owners and content requestors, access policy information, and/or other information used by various components of the content access management platform 110.

The authentication unit 225 provides functionality for verifying whether users are permitted to access the services provided by the content access management platform 110. In some implementations, the authentication unit 225 provides functionality for receiving authentication credentials for the users from their respective client device 105 and/or from the application service 125. The authentication unit 225 may be configured to verify that the authentication credentials are valid and permit the users to access the services provided by the content access management platform 110 responsive to the authentication credentials being valid.

The model tuning unit 235 is configured to fine tune the performance of the access determination model 215. The model tuning unit 235 is configured to receive feedback from the content owners and/or other authorized users that indicates whether the automated decisions to grant access to a content requestor for a particular content item was correct. The feedback includes information indicating whether a level of access granted to the content requestor for a particular content item was correct in some implementations. The model training unit 235 implements a feedback loop for improving the predictions made by the access determination model 215. The specific implementation of this feedback loop may vary depending upon the implementation of the access determination model 215.

The access-related data sources 240 are various data sources that provide information that can be used to assess the relationship between the content requestor and the content owner. These data sources may vary from implementation to implementation. Sources of such information include telemetry and usage data collected by the content access management platform 110, the application services 125, and/or the client device 105. Other sources of information include emails, messaging data, calendar and/or meeting information. Other sources of information may also be utilized in addition to or instead of one or more of these data sources.

The access-related data sources 240 also provide information indicative of a relationship between the content requestor and the content item to which the content requestor is requesting access. The access-related data sources 240 include enterprise-related data sources which may include information regarding the content owner and/or the content requestor, such as but not limited to tenure of the person within the enterprise or team within the enterprise, the title and/or position of the person within the enterprise, and/or other information indicative of the person's role or responsibilities in the enterprise. A significant mismatch between the roles and/or seniority levels of the content owner and the content requestor may indicate that the content requestor should not be automatically granted access to the content item. The access-related data sources 240 include content-related classification information in some implementations, such as but not limited to the business impact of the subject matter of a content item, how widely known the subject matter of the content item is within the organization, and/or other such information indicative of how risky granting access to the content item may be.

In some implementations, the access-related data sources 240 include relationship information between content owner and the content requestor, such as but not limited to the frequency of collaboration between the content owner and the content requestor, the frequency of communication via emails, emails and/or messages, the frequency of meetings between the content owner and the content requestor. The relationship information may be indicative of the content owner and the content requestor being frequent collaborators. Matches between the subject matter of the communications between the content owner and the content requestor and the subject matter of the content item being requested are indicative of the content requestor already being aware of the contents of the content item and may require access to the content item. Other relationship information, such as whether the content owner and the content requestor are on the same team or on different teams within the enterprise, have a similar role within the enterprise, and/or are In some implementations, the access-related data sources 240 includes working patterns of the content requestors. The working patterns may be derived from online presence information and/or application usage information collected by the content access management platform 110, the application service 125, and/or the client device 105. The working patterns of the content requestor can include information, such as but not limited to the typical working hours of the content requestors, the devices from which the content requestors typically access the content access management platform 110, the typical volume of access requests submitted by the content requestor, and/or other information that identifies the typical working pattern of the content requestor. Whether the content requestor has been authenticated using two-factor authentication or other trusted authentication techniques is also factor in the working behavior of the content requestor. Significant changes in the working behavior may indicate that the client device 105 and/or the authentication credentials of the content requestor may have been compromised, and any access requests originating from the content requestor should not be automatically granted by the content access management platform 110.

In some implementations, the access-related data sources 240 may include other information regarding the content requestor that can be used to assess whether the content requestor can be trusted and the content access management platform 110 can automatically grant access to a content item. This information may include how long the content requestor has been with the enterprise, and/or the title and level of seniority of the content requestor within the enterprise. The content access management platform 110 assigns a higher access determination score to content requestors who have been with the enterprise for longer and/or who are senior within the enterprise, because such users are less likely to be acting maliciously.

The application service 125 includes an application services unit 260 and/or an authentication unit 265. The application services unit 260 provides functionality for users to consume, create, share, collaborate on, and/or modify various types of electronic content. The application services unit 260 may utilize the content access management platform 110 to store electronic content in files and/or to access existing electronic content stored in files on the content access management platform 110 and/or the client devise 105*a*-105*d*. The files may also be organized into folders, and a folder may also include a mix of files and other folders. In some implementations, the application services unit 260 provides a web-based interface to enable users to access at least a portion of the services provided by the application service 125. In other implementations, users may access the services provided by the application service 125 via one or more native applications 250. The application services unit 260 may in turn obtain the services provided by the content access management platform 110.

The authentication unit 265 provides functionality for verifying whether users are permitted to access the services and/or documents provided by the application service 125 and/or the content access management platform 110. In some implementations, the authentication unit 265 provides functionality for receiving authentication credentials for the users from their respective client device 105. In such implementations, the authentication unit 265 verifies that the authentication credentials are valid and permit the users to access the services and/or documents provided by the application service 125 and/or the content access management platform 110 responsive to the authentication credentials being valid.

The client device 105 may include one or more native applications 250 and/or a browser application 255. In some implementations, the one or more native applications 250 includes a native application configured to communicate with the application service 125 to enable users to consume, create, share, collaborate on, and/or modify electronic content using the services provided by the application service 125. In some implementations, the one or more native applications 250 includes a native application configured to communicate with the content access management platform 110. In such implementations, the native application provides an interface for users to interact with the content access management platform 110. The user interface also enables content requestors to select content and submit requests for access to content items. Examples of such a user interface are shown in FIGS. 4A-4I. The user interface also enables the content owner to manage access requests. Examples of such a user interface are shown in FIGS. 5A-5G.

The browser application 255 is an application for accessing and viewing web-based content, which may be provided by the application service 125 and/or the content access management platform 110. The application services 125 may provide a web application 290 that enables users to consume, create, share, collaborate on, and/or modify content. A user of the client device 105 may access the web application 290 via the browser application 255 and the browser application renders a user interface for interacting with the application services 125 in the browser application 255. In some implementations, the user interface unit 230 of the content access management platform 110 provides a web application that enables the user to utilize the services of the content access management platform 110 in a similar manner as the native application described above.

The application services 125 and/or the content access management platform 110 may support both the one or more web-enabled native applications 250 and one or more web applications 290, and the users may choose which approach best suits their needs. The content access management platform 110 may also provide support for the one or more native applications 250, the browser application 255, or both to provide functionality for a user of the client device 105 to obtain the services provided by the content access management platform 110.

Figure 3A:
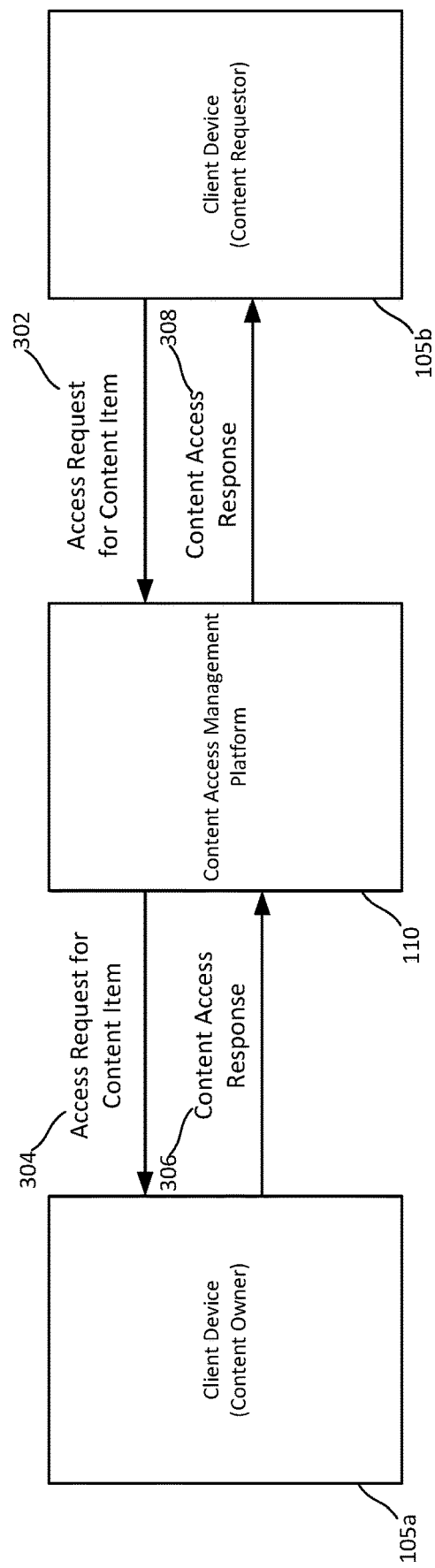
FIGS. 3A-3C show examples of interactions between the client devices and the content access management platform shown in the preceding figures.
Figure 3B:
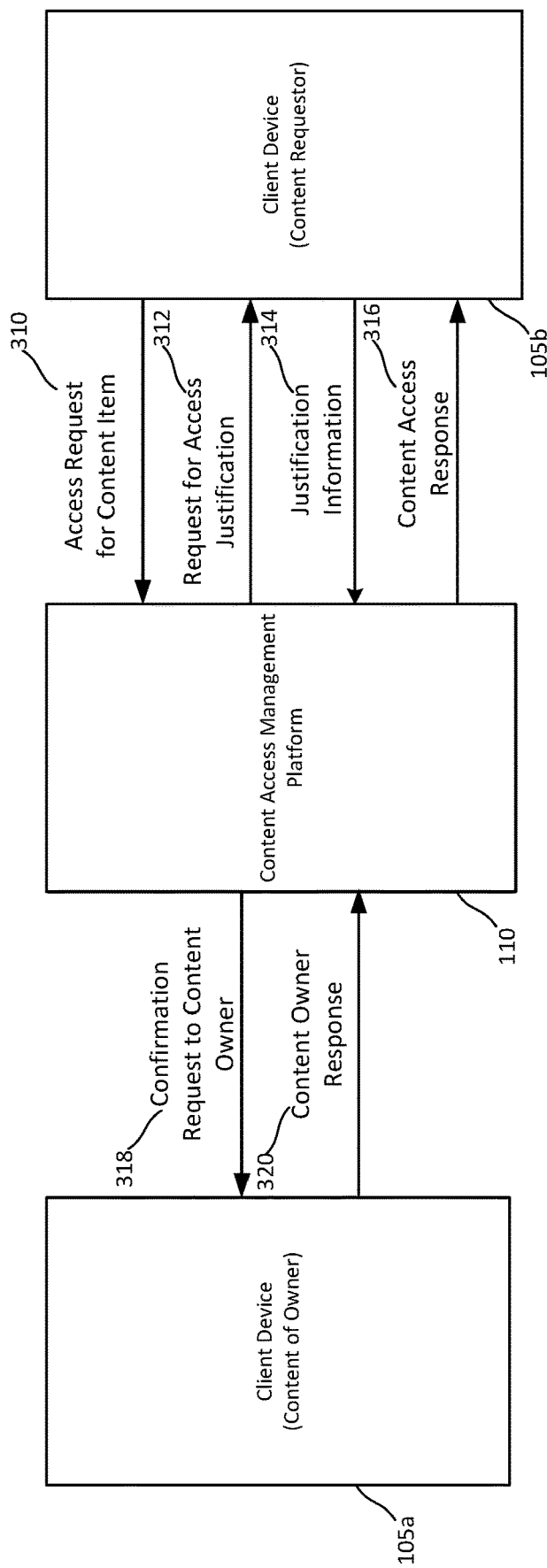
Figure 3C:
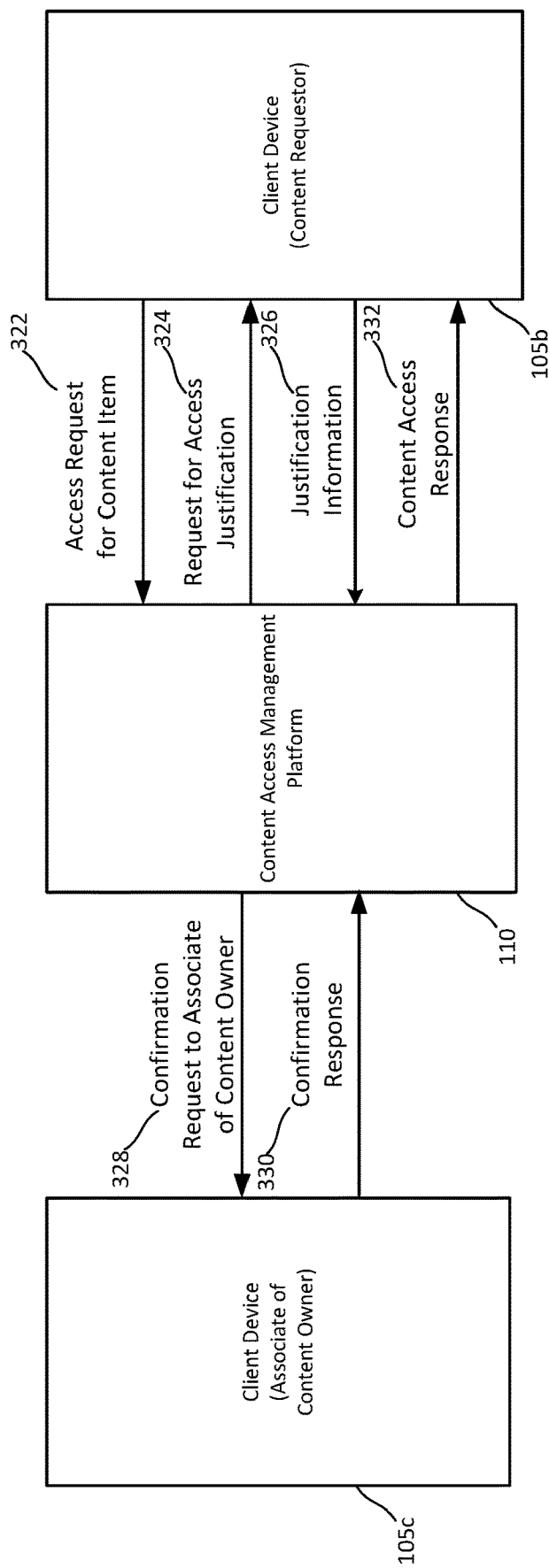

FIGS. 3A-3C show examples of interactions between the client devices 105 and the content access management platform 110. In the example shown in FIG. 3A, the client device 105b of the content requestor sends an access request 302 to the content access management platform 110. The access request 302 is generated by the native application 250 on the client device 105b in some implementations. In other implementations, the access request 302 is generated by a web-based interface of a web application implemented by the content access management platform 110, which is accessed via the browser application 255. Examples of the user interface that may be presented to the user on the client device 105 are shown in FIGS. 4A-4I, which are described in detail in the examples which follow. The access request includes an identifier of the user The access determination unit 210 of the content access management platform 110 accesses the content information from the content management datastore 220 to determine the content owner of the content item for which access has been requested. The access determination unit 210 then sends an access request 304 to the client device 105a of the content owner. In this implementation, the content owner has requested that the access requests from other users be manually processed by the content owner. This approach provides the content owner with the opportunity to consider the request and to decide whether to grant or deny access to the content item. In other implementations, the content access management platform 110 determines that the content provider is available or is likely to become available within a predetermined amount of time. The content access management platform 110 generates and sends the access request 304 to the client device 105a of the content owner. The access request 304 includes information identifying the content item for which access has been requested and information identifying the content requestor. This information may be obtained at least in part from the access request 302 sent to the content access management platform 110 and may include additional information regarding the content requestor from the content management datastore 220. In some implementations, the content access management platform 110 obtains information, such as but not limited to the work relationship information, information for current and/or past collaboration between the content requestor and the content owner, meetings information, and/or other information indicative of the relationship between the content requestor and the content owner.

The client device 105a sends a content access response 306 to the content access management platform 110 that indicates whether the content owner has granted or denied the access request 304. The client device 105a presents a user interface via the native application 250 or the browser application 255. Examples of such interfaces that may be presented to the content owner for granting or denying access to the content item are shown in FIGS. 5A-5D, which are described in detail in the examples which follow. The access determination unit 210 of the client management platform 110 generates a content access response 308 to the client device 105b of the content requestor in response to receiving the content access response 306 from the client device 105a of the content owner.

FIG. 3B is a diagram of another example implementation in which the access determination unit 210 of the content access management platform 110 requests information from the content requestor to justify granting the content requestor access to the content item. The access request 310 is similar to the access request 302 shown in FIG. 3A. However, in the example implementation shown in FIG. 3B, the access determination unit 210 of the content access management platform 110 sends a request for access justification 312 to the client device 105b of the content requestor. The client device 105b of the content requestor prompts the content requestor to provide a short description of the reason or reasons why the content requestor is requesting access to the content item. An example user interface for requesting information from the content requestor is shown in FIG. 4H. The client device 105b of the content requestor sends the justification information 314 to the content access management platform 110. The access determination unit 210 performs a semantic analysis on the justification information 314 to extract a meaning of the information provided by the content requestor. The sematic analysis may be implemented by analyzing the justification information 314 using a natural language processing (NLP) model configured to perform semantic analysis of textual content. The semantic model may be one of several access determination models 215 utilized by the content access management platform 110. The content item and/or metadata associated with the content item stored in the content management datastore 220 may include semantic information. In other implementations, the content item may be analyzed by the semantic model to obtain the semantic information about the content item. In some implementations, the content management datastore 220 analyzes the content item in response to the content item being added to the content access management platform 110 by the content owner. The access determination unit 210 compares the semantic information for the content item with the semantic information for justification information 314 to determine a relevance score. If the relevance score exceeds a predetermined threshold, the access determination unit 210 determines that the content requestor has a legitimate business reason for requesting the content item.

In the implementation shown in FIG. 3B, the access determination unit 210 uses the relevance score as one of the factors for determining whether to automatically grant access to the content item. The content access management platform 110 generates a content access response 316 indicating whether the access to the content item has been granted or denied and send the response to the client device 105b of the content requestor.

In such implementations, the access determination unit 210 generates a confirmation request 318 to the content owner requesting that the content owner verify that the automated access decision by the content access management platform 110 o grant or deny access to the content item was correct. The client device 105a of the content owner presents a user interface that enables the content owner to provide feedback to the content access management platform 110. The feedback can be used to fine-tune the performance of the models used to make the automated access decisions. The client device 105b of the content owner provides a content owner response 320 to the content access management platform 110 that includes the feedback provided by the content owner.

FIG. 3C is a diagram of another example implementation in which the access determination unit 210 of the content access management platform 110 requests a confirmation from a user associated with the content owner. The process shown in FIG. 3C can be utilized in instances where the content owner fails to respond to a request and/or is otherwise unavailable to confirm whether the content access management platform 110 has correctly granted or denied access to the content item. In such an implementation, the access request 322 is similar to the access requests 302 and 310 shown in FIGS. 3A and 3B, respectively. The request for access justification 324 is similar to the access justification 312 shown in FIG. 3B. The justification information 326 is similar to the justification information 314 shown in FIG. 3B, and the content access response 332 is similar to the content access responses 308 and 316 shown in FIGS. 3A and 3B, respectively.

In some instances, the content owner may be unavailable or not reply to requests from the content access management platform 110 to grant or deny access to content items or to requests to confirm automated decisions. The access determination unit 210 accesses information about the content owner to determine an alternate user who may confirm whether the content access management platform 110 made the correct automated decision to grant or deny access to the content item. In some implementations, the access determination unit 210 can obtain information for a supervisor of the content owner and send the confirmation request 328 to the client device 105c of the supervisor of the content owner. In other implementations, the access determination unit 210 determines whether any other users contributed to the development of the content item. In some implementations, the content access management platform 110 tracks which users author portions of or otherwise contribute to a content item. This information is stored in a version history of the content item in some implementations. In a non-limiting example, the content owner creates a document, but a second user contributes to the authoring of the document. The access determination unit 210 uses this information to determine that the second that is an associate of the content owner and has contributed to the content item and sends the confirmation request 328 to the second user. The client device 105c of the second user then sends a confirmation response 330 that indicates whether the automated access decision to grant or deny access to the content item was correct. The second user may also opt to not respond to the message or may suggest an alternate user who may be better suited to confirm whether the automated access decision was correct. The access determination unit 210 may rely on various information sources to determine relationships between the user and alternative users who may be able to confirm whether the automated access decision made by the content access management platform 110 was appropriate.

FIGS. 4A-4I are diagrams of an example user interface 405 associated with the content access management platform 110. The user interface 405 is provided by a native application 250 of the client device 105 of the content requestor in some implementations. In other implementations, the user interface 405 is provided by a web application implemented by the user interface unit 230 of the content access management platform 110 and the web application is accessed via the browser application 255 of the client device 105 of the content requestor The user interface 405 shows content items 402 that are stored on the client device 105 of the user. The user interface also shows content items associated with a first project 404 and content items associated with a second project 410. In this example, the requesting user requires access to the document 406 named "Document C" in this example. However, the user does not have permission to access the document 406.

Figure 4A:
FIGS. 4A-4I are diagrams of an example user interface for accessing content managed by the content access management platform from the client devices shown in the preceding figures.
Figure 4B:
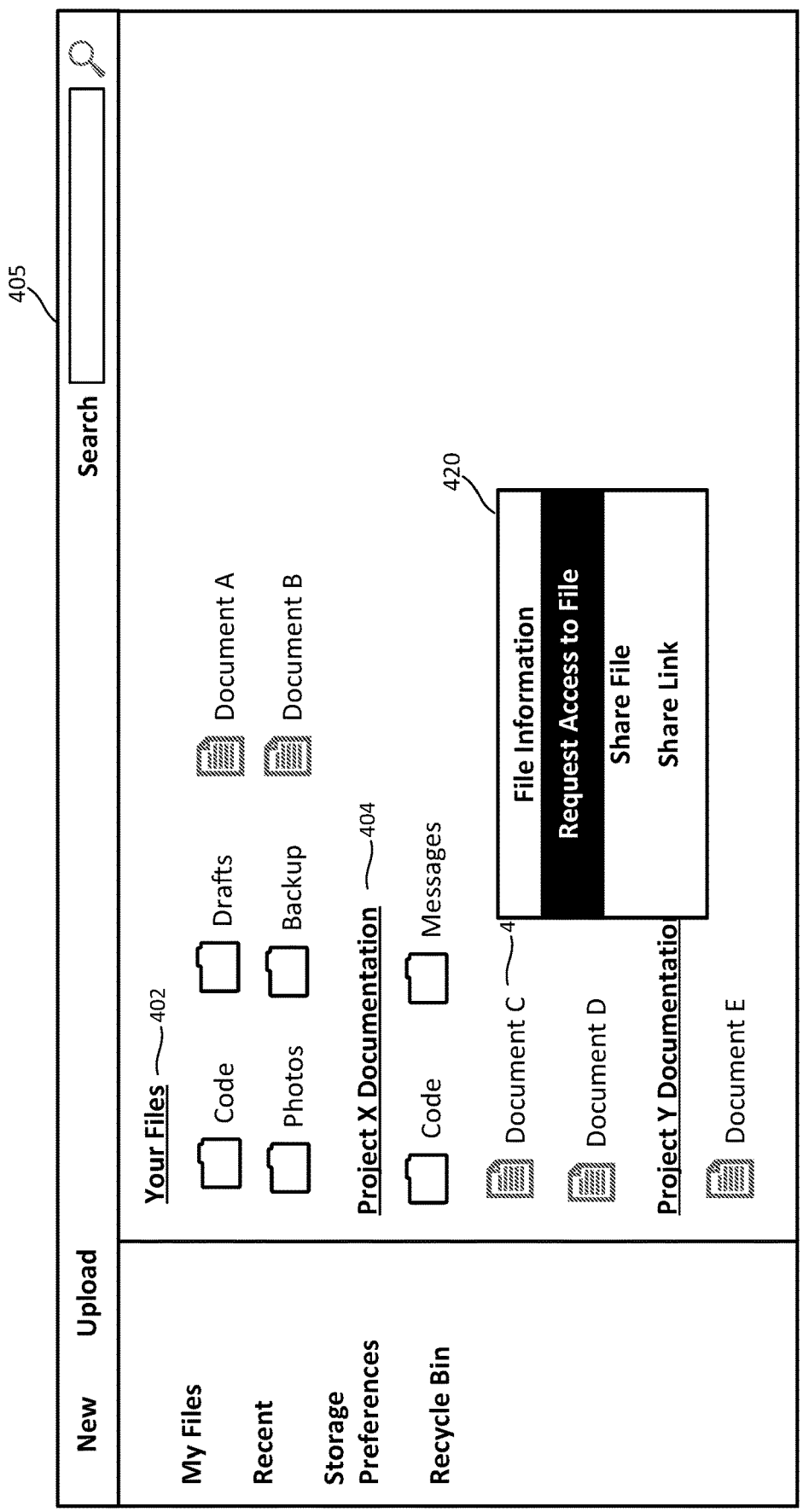
Figure 4C:
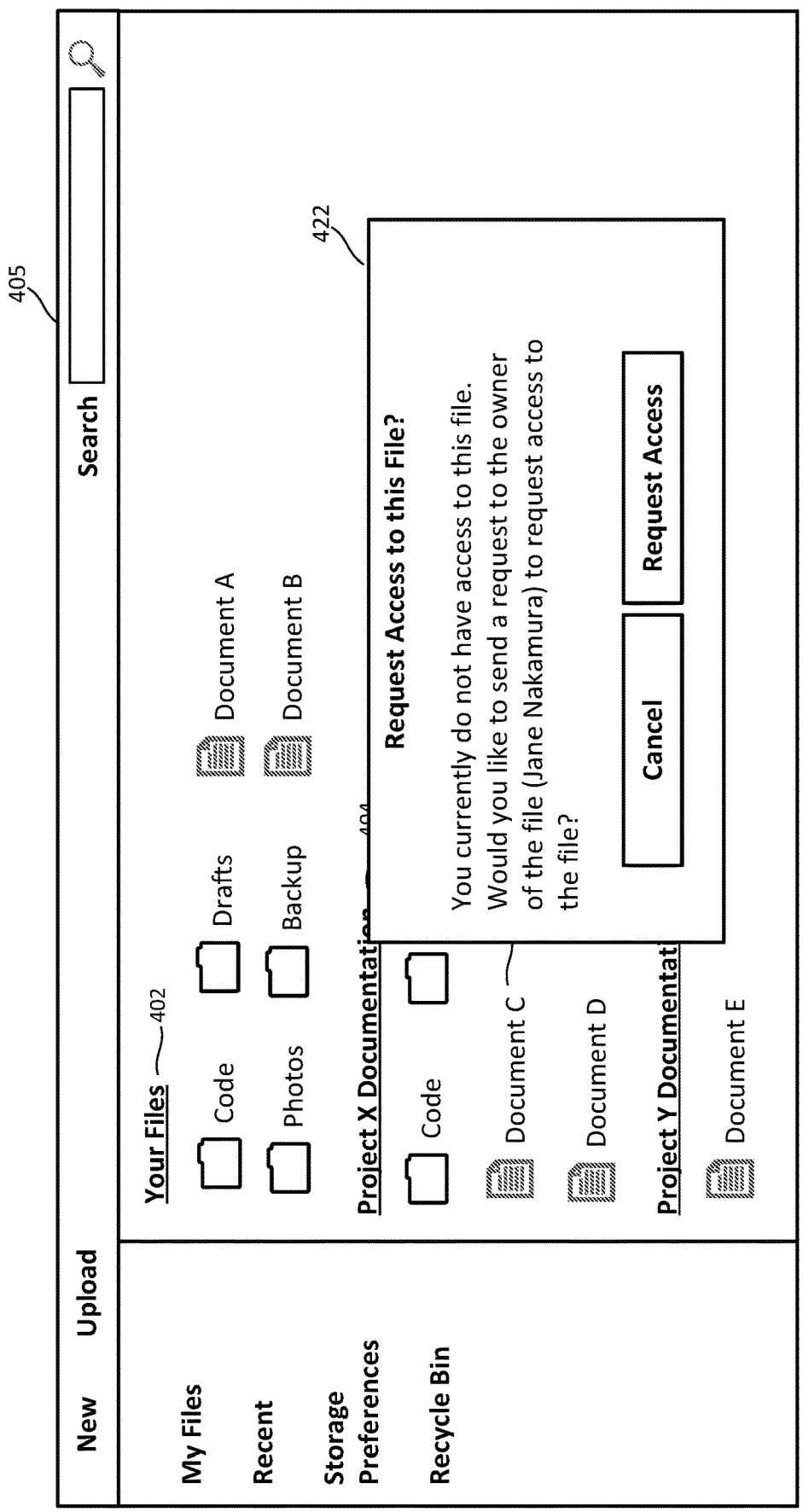

FIG. 4B shows an example of a menu 420 that is displayed in response to the user clicking, hovering over the icon of the document 406, or otherwise interacting with the document 406. The menu 420 provides various options for interacting with the document 406, including an option for requesting access to the file. In other implementations, the user interface 405 may attempt to access and open an instance of the document 406 in response to the user clicking on or otherwise interacting with the document 406. In such implementations, the user may be presented with a notification, such as the notification 422 shown in FIG. 4C, which notifies the user that they do not have access to the file. The notification 422 provides information about the content owner and asks the content requestor whether they would like to submit an access request to the content owner to obtain access to the file. The notification 422 may also be displayed in response to the user selecting the "request access to file" option from the menu 420. Clicking on or otherwise activating the "request access" option from the notification 422 causes the client device 105b of the content requestor to send an access request, similar to the access requests 302, 310, and 322 shown in FIGS. 3A-3C.

Figure 4D:
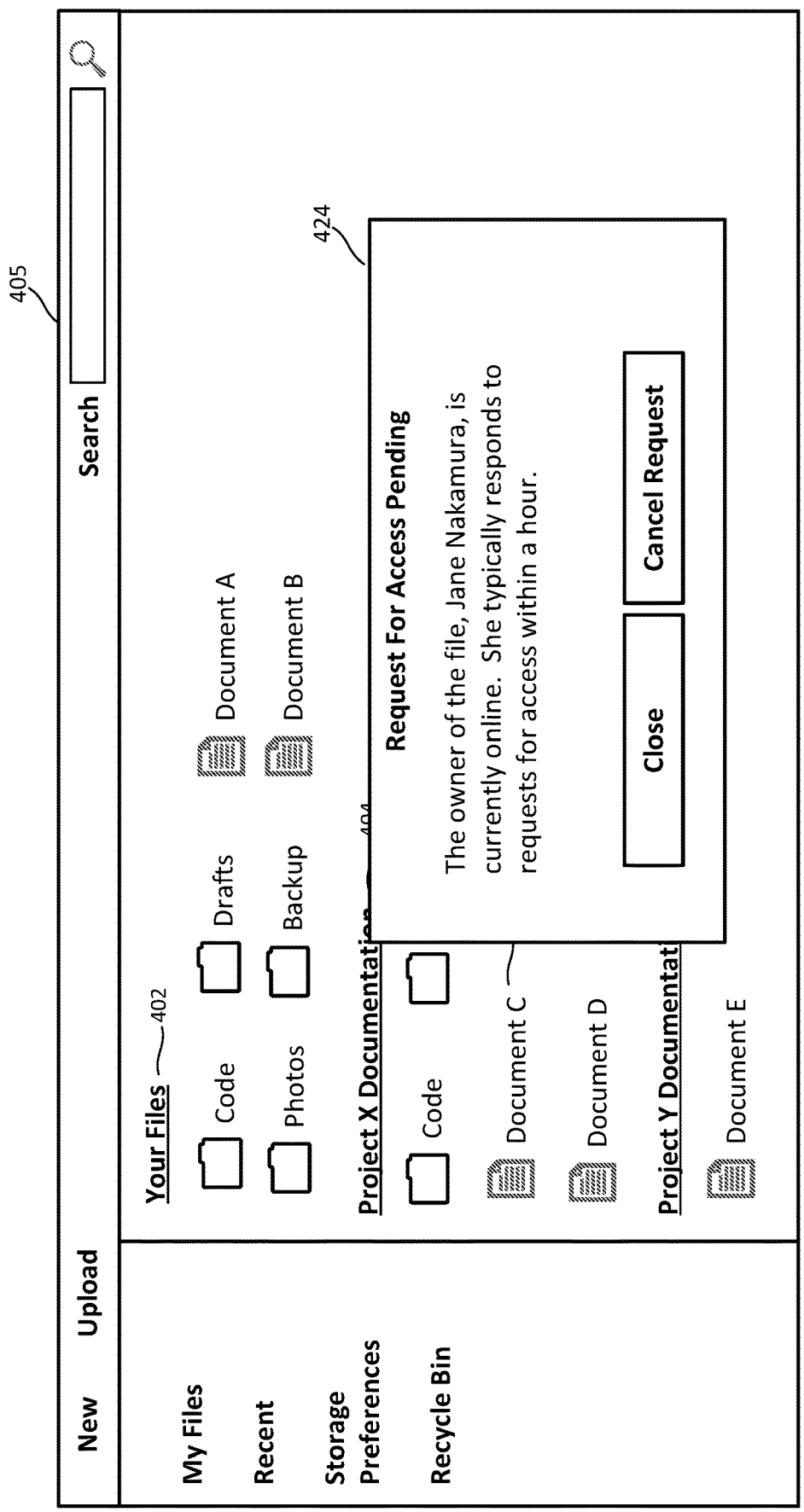

FIG. 4D is another example of the user interface 405 which provides a notification 424 indicating that the access request for the document 406 is currently pending. In this example implementation, the notification 424 includes an estimate of how long it typically takes the content owner to respond to access requests. The notification 42 may include a button or other control that allows the content requestor to cancel the pending request. The access determination unit 210 accesses historical information that indicates how long each content owner typically takes to respond to access requests. In some implementations, the time to respond to each access request may be averaged for the content owner to determine the estimate. In other implementations, the time to respond to access requests may be weighted, with more recent response times being weighted more heavily than less recent response times.

Figure 4E:
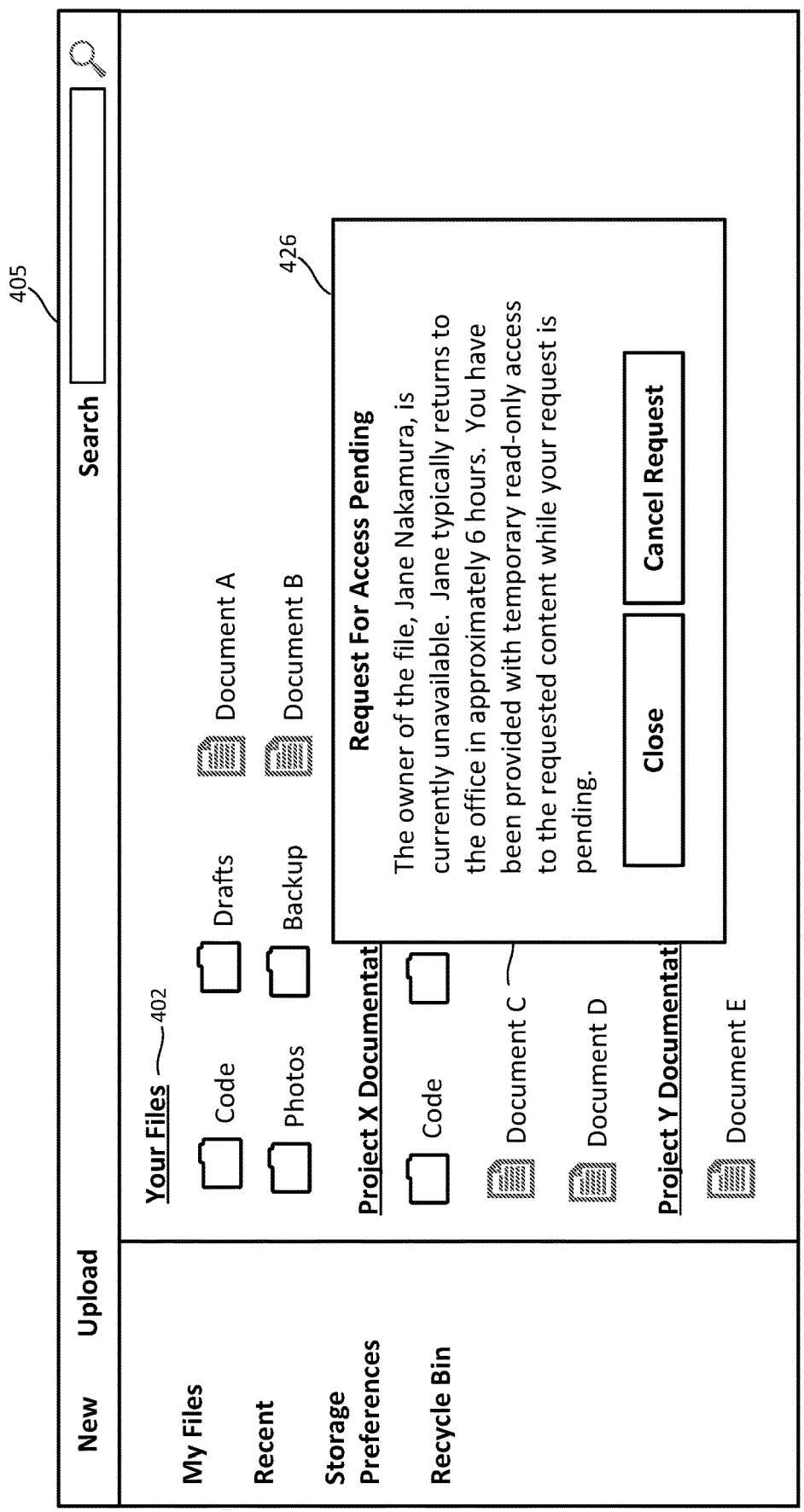

FIG. 4E is another example of the user interface 405 which provides a notification 426 indicating that the access request for the document 406 is pending but the content requestor has been granted temporary read-only access to the requested content item. In some implementations, the access determination unit 210 provides temporary access to the requested content item while the request is pending. In some implementations, the access determination unit 210 provides limited access to the content requestor while the access request is pending. The types of actions that the content requestor is permitted to perform and/or the length of time that the content requestor has access to the content item may be limited by the access determination unit 210 based on the access score determined by the access determination model 215.

Figure 4F:
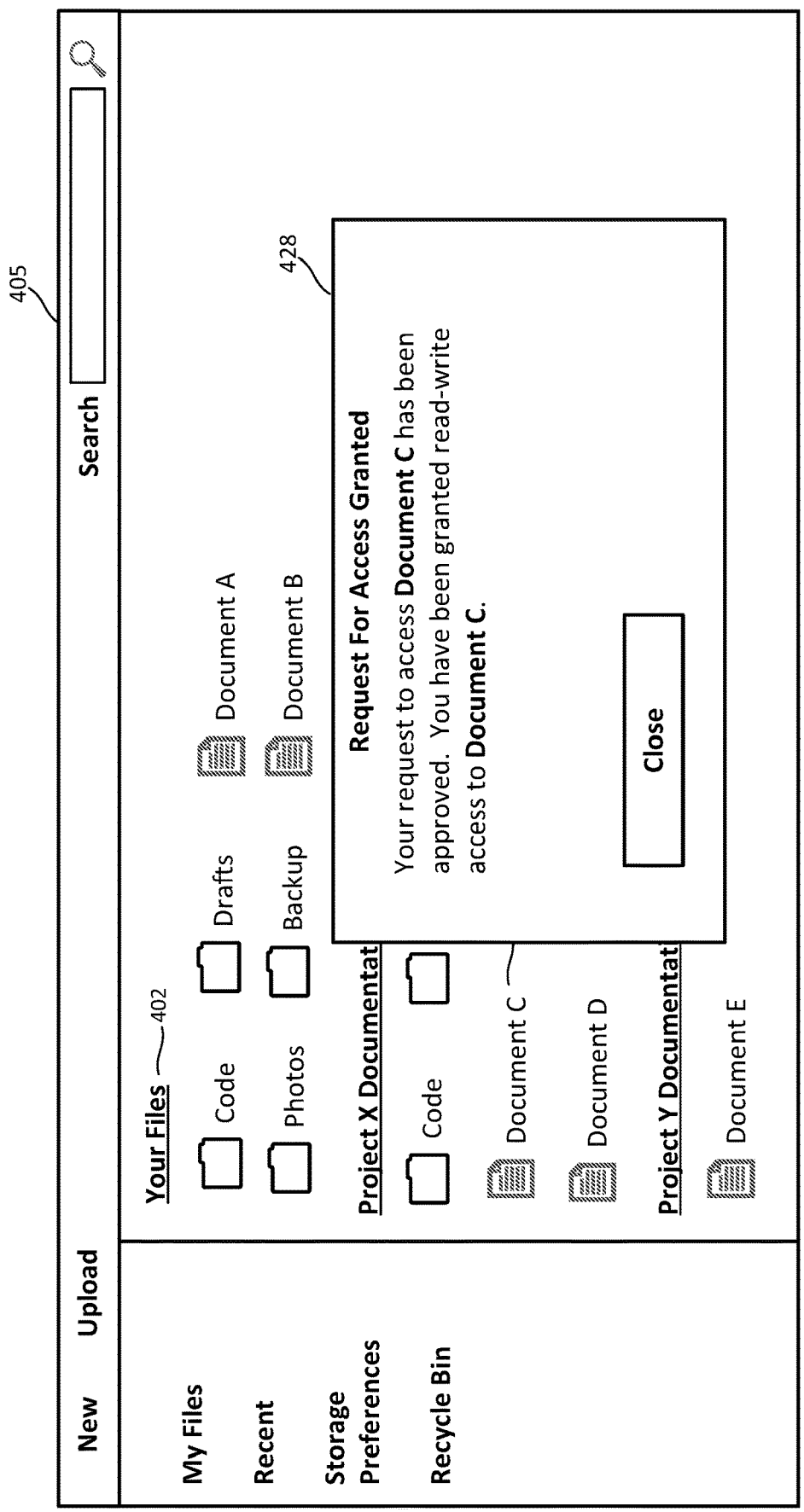

FIG. 4F is another example of the user interface 405 which provides a notification 428 indicating that access request from the content requestor has been granted. The access request may have been manually granted by the content owner or automatically granted by the access determination unit 210.

Figure 4G:
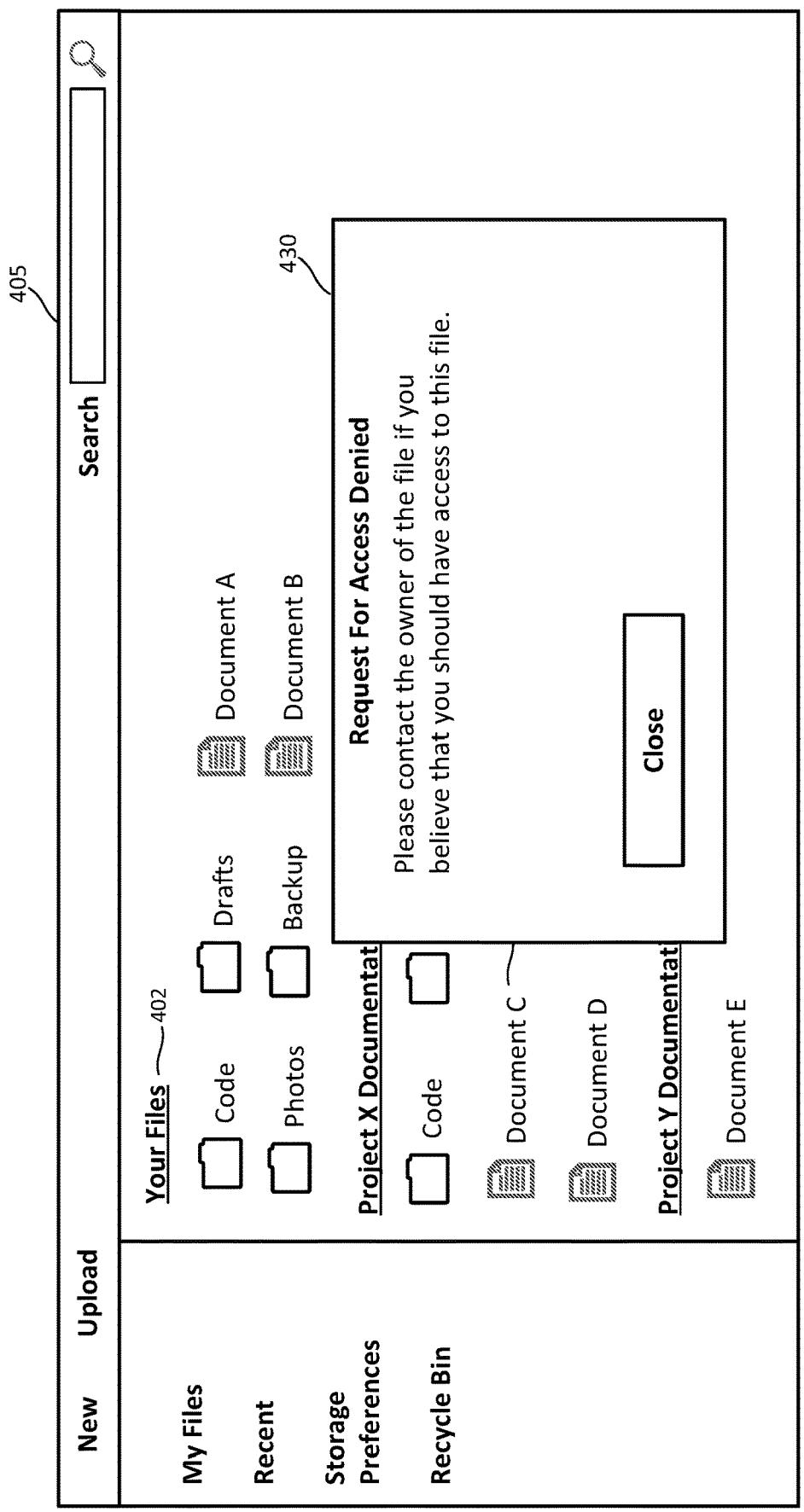
Figure 4H:
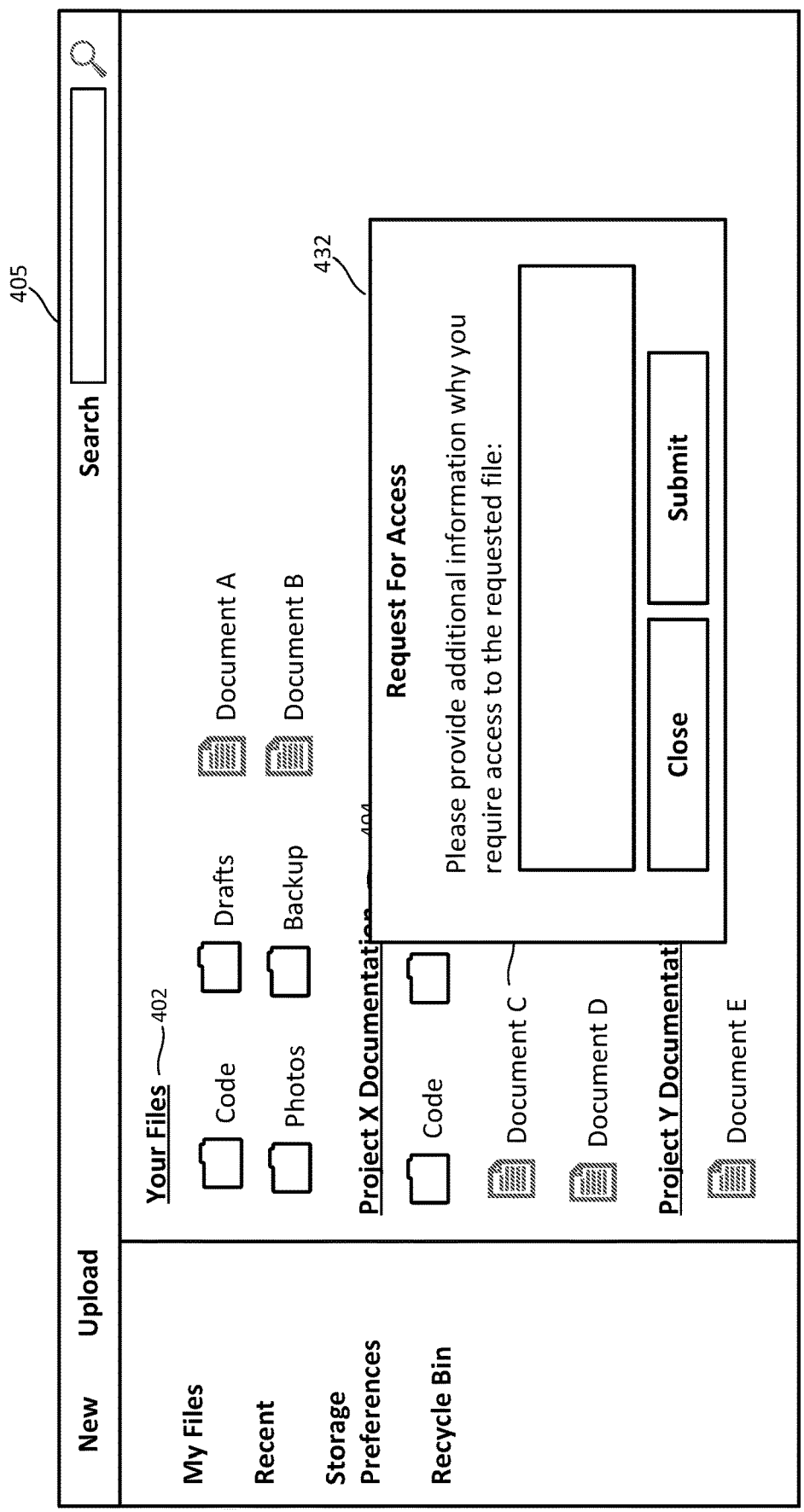

FIG. 4G is another example of the user interface 405 which provides a notification 430 indicating that the access request from the content requestor has been denied. In some implementations, the notification 430 includes information indicating why the request was denied. The notification 430 may be provided in response to the content owner manually denying the access request or in response to the access determination unit 210 automatically determining that the access request should be denied.

FIG. 4H is another example of the user interface 405 which provides a notification 432 requesting additional information from the content requestor. The notification 432 can be used to capture the justification information 314 or 326 shown in FIGS. 3B and 3C, respectively. The notification 432 may be presented to the user in response to a request for access justification, such as the requests 312 and 324 shown in FIGS. 3B and 3C.

Figure 4I:
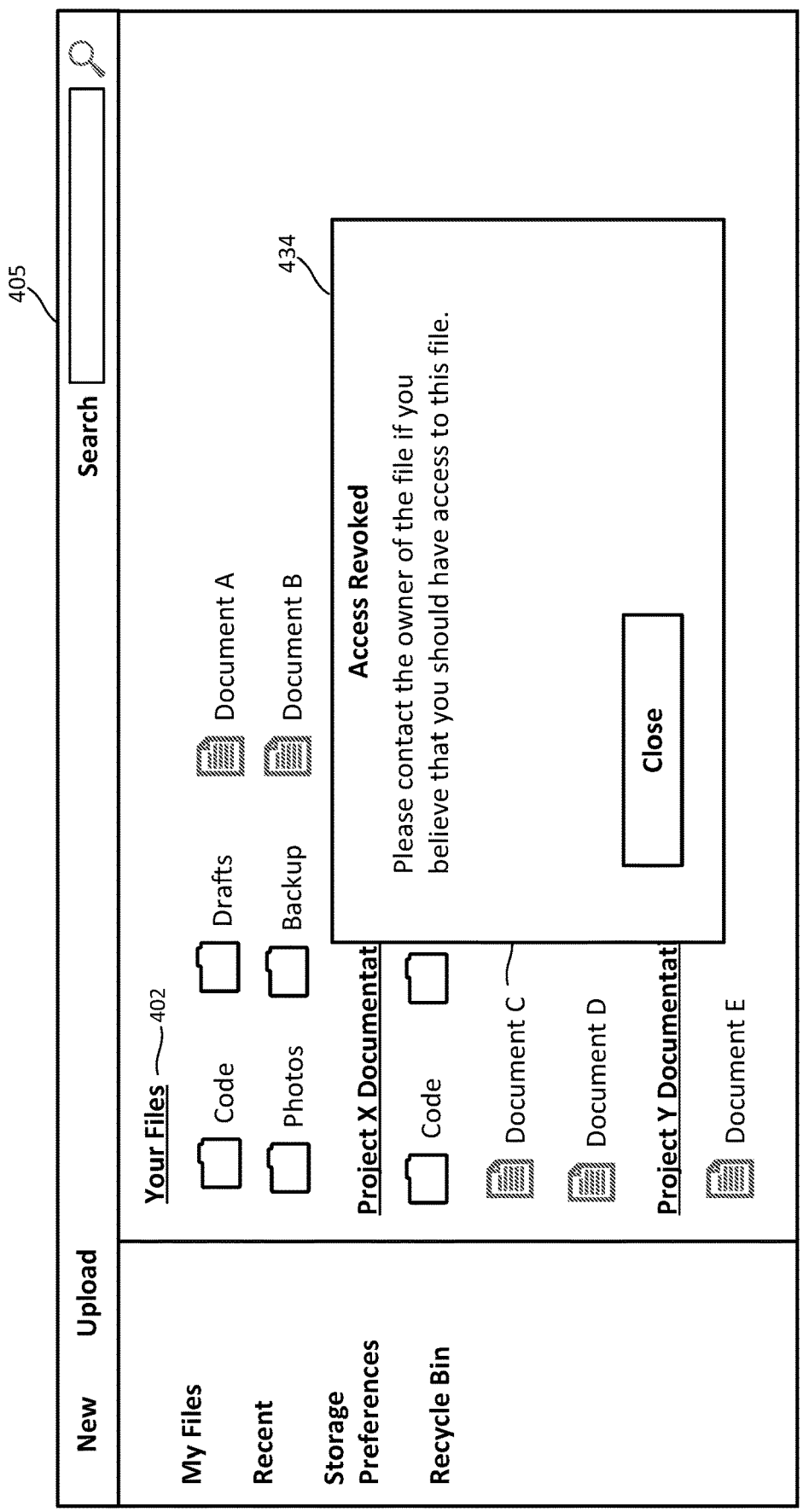

FIG. 4I is another example of the user interface 405 which provides a notification 434 indicating that access to the content item has been revoked. In some implementations, the access determination unit 210 of the content access management platform 110 is configured to monitor the behavior of a content requestor once access has been granted to the content request to access a content item. The access may have been manually granted by the content owner or automatically granted by the content access management platform 110. Significant changes in the behavior of the content requestor may indicate that the client device 105 of the content requestor and/or the authentication credentials of the content requestor may have been compromised and a malicious actor may be utilizing the client device 10 and/or the authentication credentials of the content requestor to access content items for which the content access management platform 110 manages access. In some implementations, the access determination unit 210 determines that access to the content item should not have been granted based on the behavior of the content requestor after access to content item was automatically granted by the content access management platform 110. In some implementations, the access determination unit 210 determines that access to the content item should not have been manually granted by the content owner based on the information available to the content access management platform 110.

The access determination unit 210 automatically revokes the access that has been granted in response to determining that the access should not have been granted to the content requestor. The access determination unit 210 notifies the content requestor that the access has been revoked. The access determination unit 210 causes the notification 434 to be presented to the content requestor in some implementations. The access determination unit 210 generates an email or other notification to the content requestor in some implementations. The access determination unit 210 notifies the content owner and/or other user that the access granted to the content requestor has been revoked.

FIGS. 5A-5G are examples of user interfaces that may be used by the content owner to grant or deny access requests and/or configure a level of access granted to a content requestor. The user interface examples shown in FIGS. 5A-5G are provided by a native application 250 of the client device 105 of the content owner in some implementations. In other implementations, the user interface examples shown in FIGS. 5A-5G are provided by a web application implemented by the user interface unit 230 of the content access management platform 110 and the web application is accessed via the browser application 255 of the client device 105 of the content owner.

FIG. 5A shows an example user interface 505 that displays an access request message that has been send to the content owner. The access request message may be the access request 304 shown in FIG. 3A. The access request identifies the content requestor and the content item being requested. The user interface 505 provides controls that enable the content owner to grant access to the content requestor or to deny access to the content owner.

FIG. 5B is a diagram of an example user interface 510 that is similar to the user interface 505 shown in FIG. 5A. The user interface 510 includes the justification information provided by the content requestor. This information may assist the content owner in making the decision to grant or deny access to the content item.

FIG. 5C is a diagram of an example user interface 515. The user interface 515 provides controls that enables the content user to configure the level of access granted to the content requestor for the requested content item. The user interface 515 provides controls for submitting the access configuration information input by the user and for cancelling the configuration of the access granted. The user interface 515 may be displayed in response to user selecting "Grant Access" on the user interfaces 505 or 510 or selecting "Configure Access" on the user interface 520.

FIG. 5D is a diagram of an example user interface 520. The user interface 520 shows a confirmation request that has been sent to the content owner in response to the content access management platform 110 making an automated access decision. The user interface 520 includes controls for confirming that access should have been granted, revoking the access that has been granted, and configuring the level of access that has been granted.

FIG. 5E is a diagram of an example user interface 525. The user interface 525 provides a means for the content owner or other authorized user to provide reasons why the access that was automatically granted to the content requestor should be revoked. The user interface 525 may be displayed in response to the user selecting the "Revoke Access" action from the user interface 520. The information collected from the user interface 525 may be used provided as feedback to the model training and tuning unit 235 to fine-tune the access control predictions made by the access determination model 215.

FIG. 5F shows an example user interface 530 that displays an access revocation message that has been send to the content owner. In the example shown in FIG. 5F, the content access management platform 110 automatically granted access to the content requestor and subsequently determines that this access should be revoked. The content access management platform 110 notifies the content owner that access to the content item has been revoked for the content requestor. The content owner can confirm that they agree with the revocation by clicking on the "Confirm Revocation" button. If the content owner disagrees with the revocation, the content owner can manually configure access by clicking on the "Configure Access" button which overrides the decision by the content access management platform 110. The user interface shown in FIG. 5C may then be presented to the content owner to configure access for the content requestor. The access revocation message provides reasons why the access has been revoked in some implementations. In other implementations, the content owner can click on the "More Information" button to obtain additional information why access was revoked.

FIG. 5G shows an example user interface 535 that displays an access revocation message that has been send to the content owner. In the example shown in FIG. 5G, the content owner granted access to the content requestor and the content access management platform 110 determines that this access should be revoked. The content access management platform 110 notifies the content owner that access to the content item has been revoked for the content requestor. The content owner can confirm that they agree with the revocation by clicking on the "Confirm Revocation" button. If the content owner disagrees with the revocation, the content owner can manually configure access by clicking on the "Configure Access" button which overrides the decision by the content access management platform 110. The user interface shown in FIG. 5C may then be presented to the content owner to configure access for the content requestor. The access revocation message provides reasons why the access has been revoked in some implementations. In other implementations, the content owner can click on the "More Information" button to obtain additional information why access was revoked.

Figure 6:
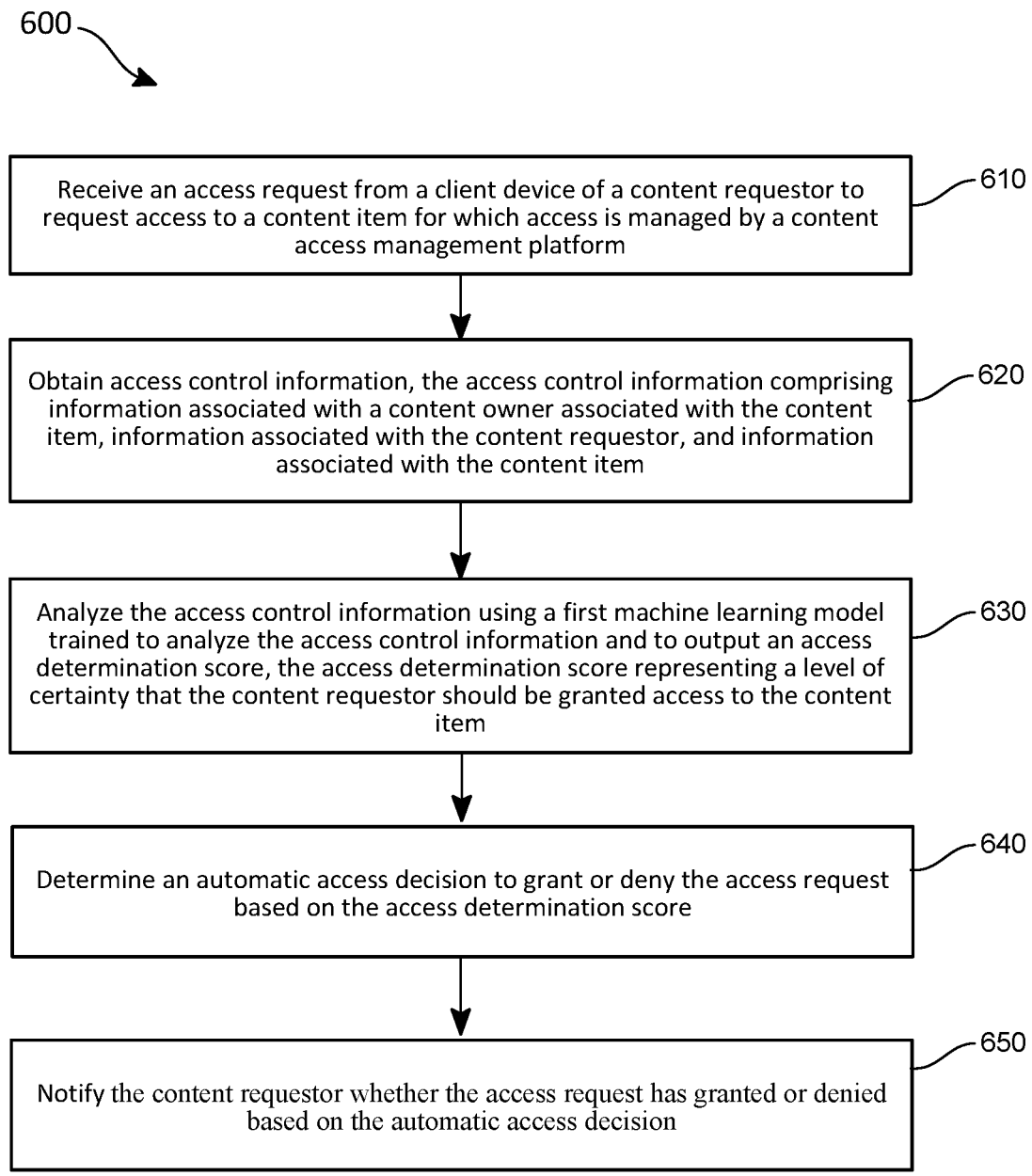
FIG. 6 is an example flow chart of another example process for access decision management.

FIG. 6 is an example flow chart of an example process 600 for automated access control decisions. The process 600 may be implemented by the content access management platform 110.

The process 600 includes an operation 610 of receiving an access request from the client device of a content requestor to access a content item for which access to the content item is managed by a content access management platform. As shown at least in FIGS. 3A-3C and the other preceding examples, the client device 105 of the content requestor sends an access request to the content access management platform 110. The request processing unit 205 of the content access management platform 110 receives the access request and provides the request to the access determination unit 210 for processing.

The process 600 includes an operation 620 of obtaining access control information. The access control information may include information related to a content owner associated with the content item, information associated with the content requestor, and information associated with the content item. The access determination unit 210 accesses information from numerous data sources, as discussed in the preceding examples, to make an access determination whether to automatically grant or deny access to the content item by the content requestor. The information from these various sources may be stored in the content management datastore 220.

The process 600 includes an operation 630 of analyzing the access control information using a first machine learning model trained to analyze the access control information and to output an access determination score. The first machine learning model is access determination model 215. The access determination score represents a level of certainty that the content requestor should be granted access to the content item.

The process 600 includes an operation 640 of determining an automatic access decision to grant or deny the access request based on the access determination score. As discussed in the preceding examples, the access determination unit 210 grants at least some level of access to the content requestor responsive to the access determination score exceeding a predetermined threshold. Otherwise, the access determination unit 210 denies the access request. The access determination unit 210 is configured to grant different levels of access based on the access determination score in other implementations.

The process 600 includes an operation 650 of notifying the content requestor whether the access request has granted or denied based on the automatic access decision. The content access management platform 110 provides a content access response to the client device 105 of the content requestor. As shown at least in FIGS. 4C-4G, the content access response is presented to the user on a user interface of the client device 105 of the content requestor.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
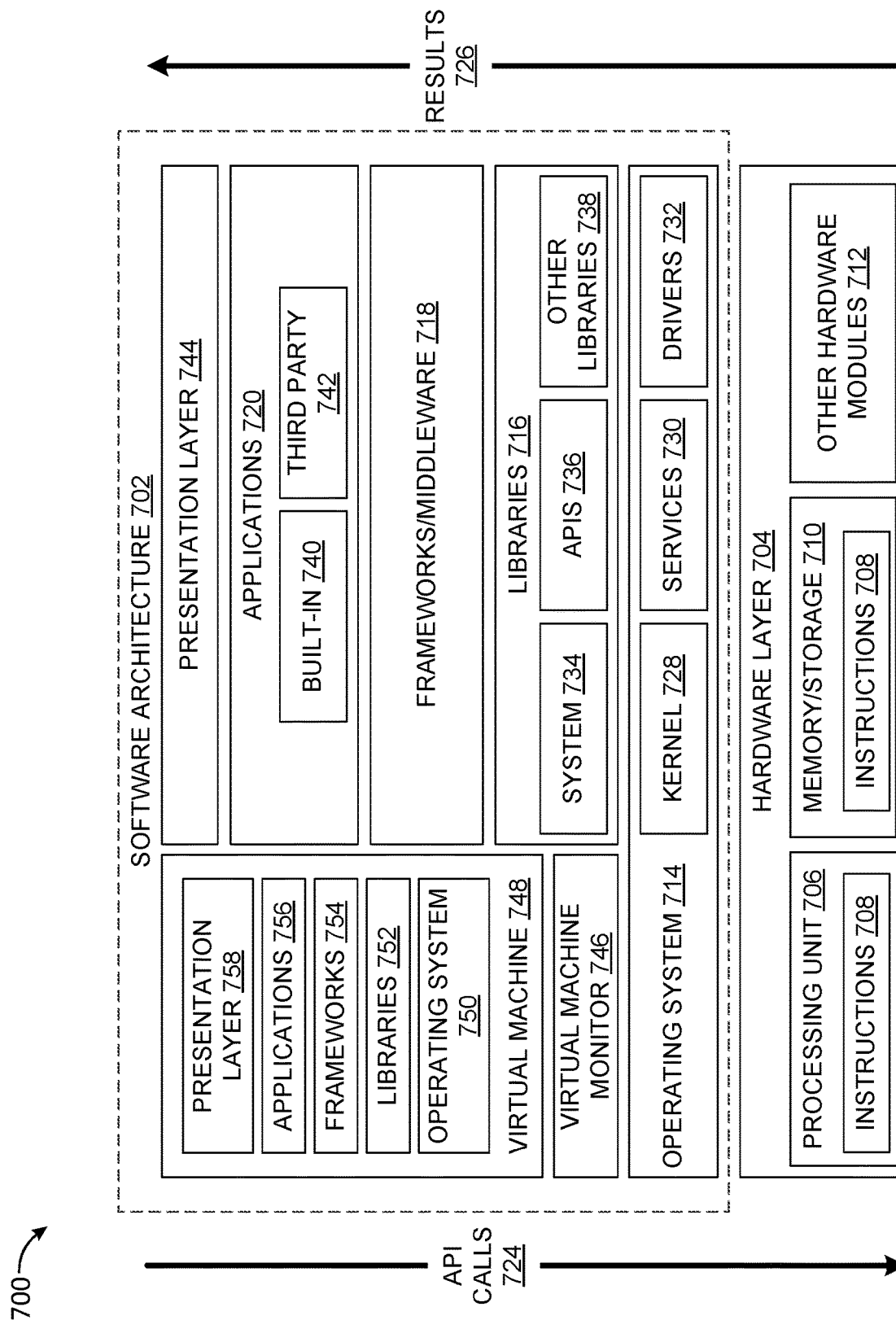
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/ modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
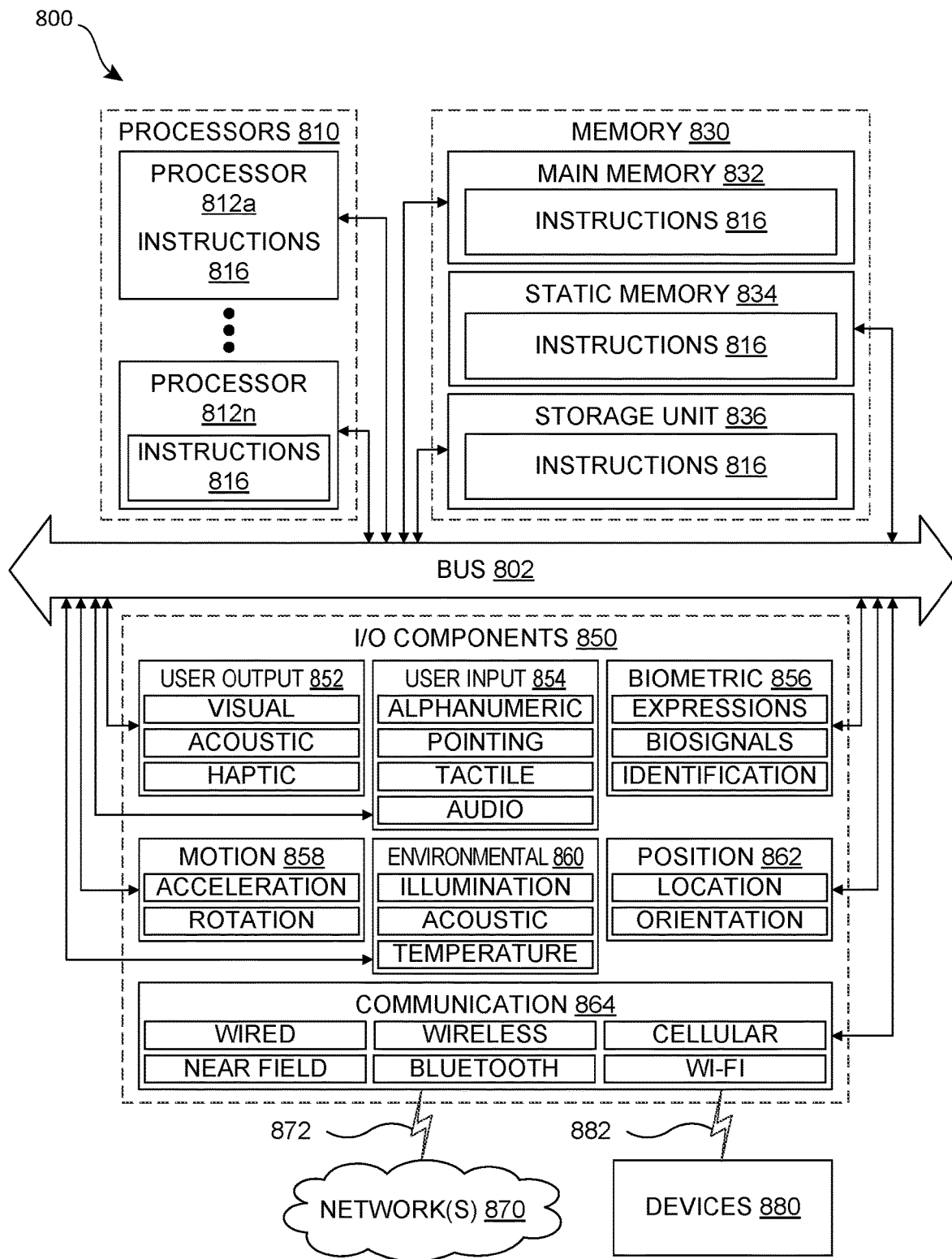
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
receiving an access request from a client device of a content requestor to request access to a content item for which access is managed by a content access management platform;
obtaining access control information, the access control information comprising information associated with a content owner associated with the content item, information associated with the content requestor, and information associated with the content item;
sending a request to the client device of the content requestor for access justification information describing a reason the content requestor requires access to the content item;
receiving the access justification information from the client device of the content requestor;
analyzing the access justification information using a first machine learning model trained to receive the access justification information as an input, to perform a semantic analysis of the access justification information, and to output semantic information representing a meaning of the access justification information;
analyzing the access control information and the semantic information using a second machine learning model trained to analyze the access control information and to output an access determination score, the access determination score representing a level of certainty that the content requestor should be granted access to the content item;
determining an automatic access decision to grant or deny the access request based on the access determination score; and
notifying the content requestor whether the access request has granted or denied based on the automatic access decision.

2. The data processing system of claim 1, wherein determining whether to automatically grant or deny the access request based on the access determination score further comprises:
determining a level of access to grant to the content requestor based on the access determination score.

3. The data processing system of claim 2, wherein the machine-readable medium includes instructions configured to cause the processor to perform operations of:
determining, based on the access determination score, that the content requestor should be granted temporary access to the content item.

4. The data processing system of claim 3, wherein the machine-readable medium includes instructions configured to cause the processor to perform operations of:
sending an access control request to a client device of the content owner to grant or deny access to the content item;
receiving a content access response from the client device of the content owner indicating whether the content requestor should be granted or denied access to the content item; and
granting or denying access to the content item by the content requestor in response to receiving the content access response.

5. The data processing system of claim 3, wherein the machine-readable medium includes instructions configured to cause the processor to perform operations of:
receiving access configuration information from the client device of the content owner indicating the level of access to be granted to the content requestor; and
granting access to the content requestor at the level of access indicated in the access configuration information.

6. The data processing system of claim 2, wherein the machine-readable medium includes instructions configured to cause the processor to perform operations of:
sending a confirmation request to the content owner requesting that the content owner confirm whether the automatic access decision was correct; and
receiving a confirmation response from the content owner.

7. The data processing system of claim 6, wherein the machine-readable medium includes instructions configured to cause the processor to perform operations of:
overriding the automatic access decision responsive to the confirmation response from the content owner indicating that the automatic access decision was incorrect.

8. The data processing system of claim 6, wherein the machine-readable medium includes instructions configured to cause the processor to perform operations of:
receiving access configuration information from the client device of the content owner indicating the level of access that should have been granted to the content requestor; and
overriding the level of access associated with the automatic access decision based on the access configuration information received from the content requestor.

9. The data processing system of claim 6, wherein the machine-readable medium includes instructions configured to cause the processor to perform operations of:
fine tuning parameters of the second machine learning model based on the confirmation response received from the content owner.

10. The data processing system of claim 6, wherein the machine-readable medium includes instructions configured to cause the processor to perform operations of:
determining that the content owner is unavailable;
identifying an alternative user associated with the content owner responsive to determining that the content owner is unavailable;
sending the confirmation request to the alternative user requesting whether the alternative user confirm that the automatic access decision was correct; and
receiving a confirmation response from the alternative user.

11. The data processing system of claim 2, wherein the machine-readable medium includes instructions configured to cause the processor to perform operations of:
monitoring behavior of the content requestor after granting access to the content item by the content requestor;
determining that access to the content item should be revoked based on the behavior of the content requestor; and automatically revoking access to the content item by the content requestor responsive to determining that the access to the content item should be revoked.

12. A data processing system comprising:

a processor; and a machine-readable medium storing executable instructions that, when executed, cause the processor to perform operations comprising:

receiving an access request from a client device of a content requestor to access a content item for which access is managed by a content access management platform;

obtaining relationship information indicative of a relationship between a content owner and the content requestor;

sending a request to the client device of the content requestor for access justification information describing a reason the content requestor requires access to the content item;

receiving the access justification information from the client device of the content requestor;

analyzing the access justification information using a first machine learning model trained to receive the access justification information as an input, to perform a semantic analysis of the access justification information, and to output semantic information representing a meaning of the access justification information;

analyzing the relationship information and the semantic information using a second machine learning model trained to analyze the relationship information and to output an access determination score, the access determination score representing a level of certainty that the content requestor should be granted access to the content item;

determining an automatic access decision to grant or deny the access request based on the access determination score; and notifying the content requestor whether the access request has granted or denied based on the automatic access decision.

13. The data processing system of claim 12, wherein determining whether to automatically grant or deny the access request based on the access determination score further comprises:

determining a level of access to grant to the content requestor based on the access determination score.

14. A method implemented in a data processing system for automated access control decisions, the method comprising:

receiving an access request from a client device of a content requestor to request access to a content item for which access is managed by a content access management platform;

obtaining access control information, the access control information comprising information associated with a content owner associated with the content item, information associated with the content requestor, and information associated with the content item;

sending a request to the client device of the content requestor for access justification information describing a reason the content requestor requires access to the content item;

receiving the access justification information from the client device of the content requestor;

analyzing the access justification information using a first machine learning model trained to receive the access justification information as an input, to perform a semantic analysis of the access justification information, and to output semantic information representing a meaning of the access justification information;

analyzing the access control information and the semantic information using a second machine learning model trained to analyze the access control information and to output an access determination score, the access determination score representing a level of certainty that the content requestor should be granted access to the content item;

determining an automatic access decision to grant or deny the access request based on the access determination score; and notifying the content requestor whether the access request has granted or denied based on the automatic access decision.

15. The method of claim 14, wherein determining whether to automatically grant or deny the access request based on the access determination score further comprises:

determining a level of access to grant to the content requestor based on the access determination score.

16. The method of claim 15, further comprising:

determining, based on the access determination score, that the content requestor should be granted temporary access to the content item.

17. The method of claim 16, further comprising:

sending an access control request to a client device of the content owner to grant or deny access to the content item to the content requestor;

receiving a content access response from the client device of the content owner indicating whether to grant or deny access to the content item to the content requestor; and granting or denying access to the content item to the content requestor in response to receiving the content access response.

18. The method of claim 16, further comprising:

receiving access configuration information from the client device of the content owner indicating the level of access to grant to the content requestor; and granting access to the content requestor at the level of access indicated in the access configuration information.

19. The method of claim 16, further comprising:

sending a confirmation request to the content owner requesting that the content owner confirm whether the automatic access decision was correct;

receiving a confirmation response from the content owner; and overriding the automatic access decision responsive to the confirmation response from the content owner indicating that the automatic access decision was incorrect.

* * * * *